US011632314B2

(12) United States Patent
Matsushima et al.

(10) Patent No.: US 11,632,314 B2
(45) Date of Patent: *Apr. 18, 2023

(54) INFORMATION MANAGEMENT METHOD

(71) Applicant: PANASONIC INTELLECTUAL PROPERTY CORPORATION OF AMERICA, Torrance, CA (US)

(72) Inventors: Hideki Matsushima, Tokyo (JP); Motoji Ohmori, Osaka (JP); Natsume Matsuzaki, Osaka (JP); Yuichi Futa, Ishikawa (JP); Toshihisa Nakano, Osaka (JP); Manabu Maeda, Osaka (JP); Yuji Unagami, Osaka (JP); Hiroshi Amano, Osaka (JP); Kotaro Hakoda, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/693,803

(22) Filed: Mar. 14, 2022

(65) Prior Publication Data

US 2022/0278908 A1    Sep. 1, 2022

Related U.S. Application Data

(63) Continuation of application No. 17/189,795, filed on Mar. 2, 2021, now Pat. No. 11,303,547, which is a (Continued)

(30) Foreign Application Priority Data

Jul. 22, 2013   (JP) .............................. JP2013-151729

(51) Int. Cl.
*H04L 43/04*   (2022.01)
*G06F 21/55*   (2013.01)
(Continued)

(52) U.S. Cl.
CPC ............ *H04L 43/04* (2013.01); *G06F 21/552* (2013.01); *G06Q 10/20* (2013.01); *H04L 41/069* (2013.01); *H04L 67/10* (2013.01)

(58) Field of Classification Search
None
See application file for complete search history.

(56) References Cited

U.S. PATENT DOCUMENTS 6,618,764 B1   9/2003   Shteyn
6,725,281 B1   4/2004   Zintel et al.
(Continued)

FOREIGN PATENT DOCUMENTS

JP   2005-025663   1/2005
JP   2005-291642   10/2005
JP   2006-136650   6/2006

OTHER PUBLICATIONS

International Search Report of PCT application No. PCT/JP2014/002544 dated Aug. 19, 2014.

*Primary Examiner* — Ranodhi Serrao
(74) *Attorney, Agent, or Firm* — Greenblum & Bernstein, P.L.C.

(57) ABSTRACT

An information management method collects log information of one or more home electrical apparatuses corresponding to service providers. Display screen data is generated which indicates a status of the log information. The display screen data includes groups of information which each contain information on an apparatus, a service provider corresponding to the apparatus, and log information output from the apparatus. Provision of the log information of each group is individually selectable. The display screen data is provided via a network to a display terminal that performs access to a server device. Information is received from the display terminal, which indicates that selection on whether or not provision of the log information is performed. Pro- (Continued)

| GATEWAY ID | APPARATUS ID | LOG PROVISION PERMISSIBILITY | LOG PROVISION STATUS | PROVISION DESTINATION COMPANY | HOME ELECTRICAL APPARATUS KIND | PROVISION LOG KIND | PURPOSE OF USE | PROVISION END DATE | PROVISION RESUMPTION DATE |
|---|---|---|---|---|---|---|---|---|---|
| 3245 6389 | 123456 | PERMISSION | PROVIDING | COMPANY L | LIGHT | LIGHTING TIME | BEHAVIOR ANALYSIS | | |
| | 567890 | PERMISSION | PROVIDING | COMPANY M | AIR CONDITIONER | CONTINUOUS ENERGIZATION TIME | BEHAVIOR ANALYSIS | | |
| | 234567 | PERMISSION | PROVIDING | COMPANY A | MICROWAVE | OPEN-CLOSE LOG | HOUSEKEEPING TENDENCY ANALYSIS | | |
| | 678901 | PERMISSION | PROVIDING | COMPANY A | REFRIGERATOR | OPEN-CLOSE LOG | | | |
| | 678901 | PERMISSION | PROVIDING | COMPANY A | REFRIGERATOR | PHOTOGRAPH OF INTERNAL PORTION | | | |
| | 678901 | REFUSAL | PROVIDING | COMPANY B | REFRIGERATOR | OPEN-CLOSE LOG SEX OF USER | ANALYSIS OF USE STATE OF REFRIGERATOR IN ACCORDANCE WITH MALE OR FEMALE | 2013.03.05 | |
| | 896023 | REFUSAL | PROVISION STOPPED | COMPANY C | TV | VIEW HISTORY INSTALLATION POSITION INFORMATION | REGIONAL VIEW HISTORY ANALYSIS | | |
| | : | | | | | | | | | vision of the log information is not performed on the selected group when a determination is made that refusal of provision of the log information on the selected group is performed.

3 Claims, 35 Drawing Sheets

Related U.S. Application Data continuation of application No. 16/355,069, filed on Mar. 15, 2019, now Pat. No. 10,965,557, which is a continuation of application No. 15/673,748, filed on Aug. 10, 2017, now Pat. No. 10,284,442, which is a continuation of application No. 14/740,065, filed on Jun. 15, 2015, now Pat. No. 9,762,459, which is a continuation of application No. PCT/JP2014/002544, filed on May 14, 2014.

(51) Int. Cl.
G06Q 10/00 (2012.01)
H04L 41/069 (2022.01)
H04L 67/10 (2022.01)
G06Q 10/20 (2023.01)

(56) References Cited

U.S. PATENT DOCUMENTS

| | | | |
|---|---|---|---|
| 6,917,976 B1 | 7/2005 | Slaughter et al. | |
| 6,970,869 B1 | 11/2005 | Slaughter et al. | |
| 7,349,967 B2 | 3/2008 | Wang | |
| 7,398,305 B2 | 7/2008 | Bodin et al. | |
| 7,594,179 B2 * | 9/2009 | Takemura | H04L 12/2818 715/706 |
| 7,660,756 B2 | 2/2010 | Nakamura et al. | |
| 7,823,074 B2 * | 10/2010 | Takemura | H04L 12/282 715/848 |
| 8,307,201 B2 * | 11/2012 | Wakita | G06F 21/6245 713/153 |
| 8,316,082 B2 | 11/2012 | Igarashi | |
| 8,786,887 B2 | 7/2014 | Oku et al. | |
| 9,684,796 B2 | 6/2017 | Wakita et al. | |
| 9,844,243 B2 | 12/2017 | Langvin et al. | |
| 10,417,444 B2 | 9/2019 | Wakita et al. | |
| 2002/0026289 A1 | 2/2002 | Kuzunuki et al. | |
| 2002/0188565 A1 * | 12/2002 | Nakamura | G06Q 20/108 705/42 |
| 2003/0001883 A1 | 1/2003 | Wang | |
| 2003/0187920 A1 | 10/2003 | Redkar | |
| 2003/0229900 A1 | 12/2003 | Reisman | |
| 2004/0078542 A1 | 4/2004 | Fuller et al. | |
| 2005/0144049 A1 | 6/2005 | Kuzunuki et al. | |
| 2005/0154574 A1 * | 7/2005 | Takemura | H04L 12/2803 703/22 |
| 2005/0210395 A1 * | 9/2005 | Wakita | G06F 21/6245 715/753 |
| 2006/0155802 A1 | 7/2006 | He et al. | |
| 2006/0155851 A1 | 7/2006 | Ma et al. | |
| 2006/0168656 A1 | 7/2006 | Stirbu | |
| 2006/0279774 A1 | 12/2006 | Matsuoka et al. | |
| 2007/0203979 A1 | 8/2007 | Walker et al. | |
| 2007/0274327 A1 | 11/2007 | Kaarela et al. | |
| 2007/0276926 A1 | 11/2007 | LaJoie et al. | |
| 2008/0091776 A1 | 4/2008 | Miyamoto | |
| 2008/0205419 A1 | 8/2008 | Shin et al. | |
| 2009/0080453 A1 | 3/2009 | Stirbu | |
| 2009/0100355 A1 * | 4/2009 | Takemura | H04L 12/282 715/757 |
| 2009/0100492 A1 | 4/2009 | Hicks, III et al. | |
| 2009/0180484 A1 | 7/2009 | Igarashi | |
| 2009/0193469 A1 | 7/2009 | Igarashi | |
| 2009/0307307 A1 | 12/2009 | Igarashi | |
| 2010/0071053 A1 | 3/2010 | Ansari et al. | |
| 2010/0269146 A1 | 10/2010 | Britt | |
| 2010/0306404 A1 * | 12/2010 | Wakita | G06Q 10/10 715/810 |
| 2012/0072729 A1 | 3/2012 | Winograd et al. | |
| 2012/0072730 A1 | 3/2012 | Winograd et al. | |
| 2012/0072731 A1 | 3/2012 | Winograd et al. | |
| 2013/0016393 A1 | 1/2013 | Oku et al. | |
| 2013/0067356 A1 * | 3/2013 | Wakita | G06Q 10/10 715/753 |
| 2013/0102346 A1 | 4/2013 | Ehara | |
| 2015/0026206 A1 * | 1/2015 | Miura | H04N 21/44224 707/758 |
| 2015/0052443 A1 * | 2/2015 | Funase | G06F 3/0484 715/736 |
| 2015/0081673 A1 * | 3/2015 | Kaneko | G06F 16/287 707/722 |

\* cited by examiner

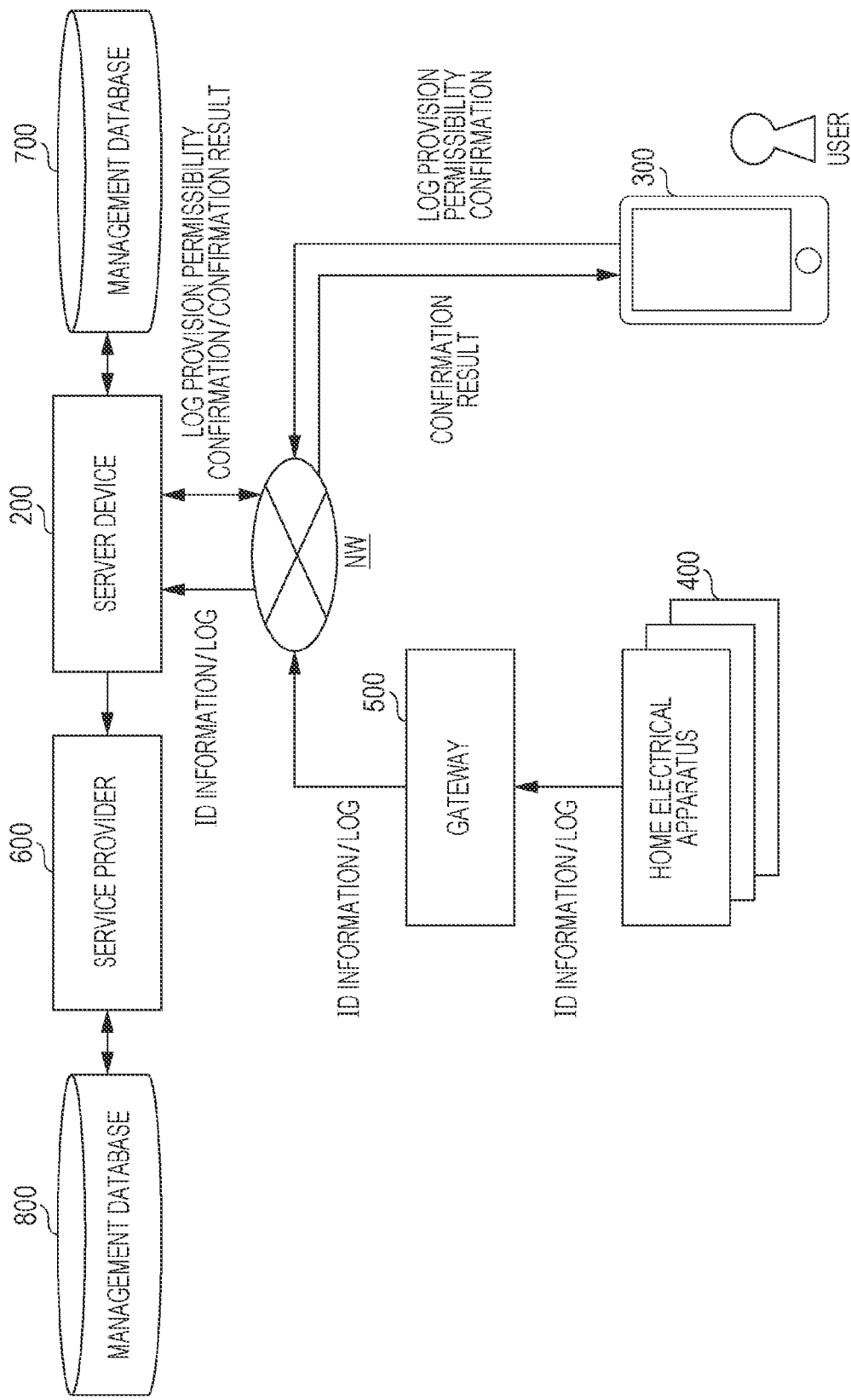

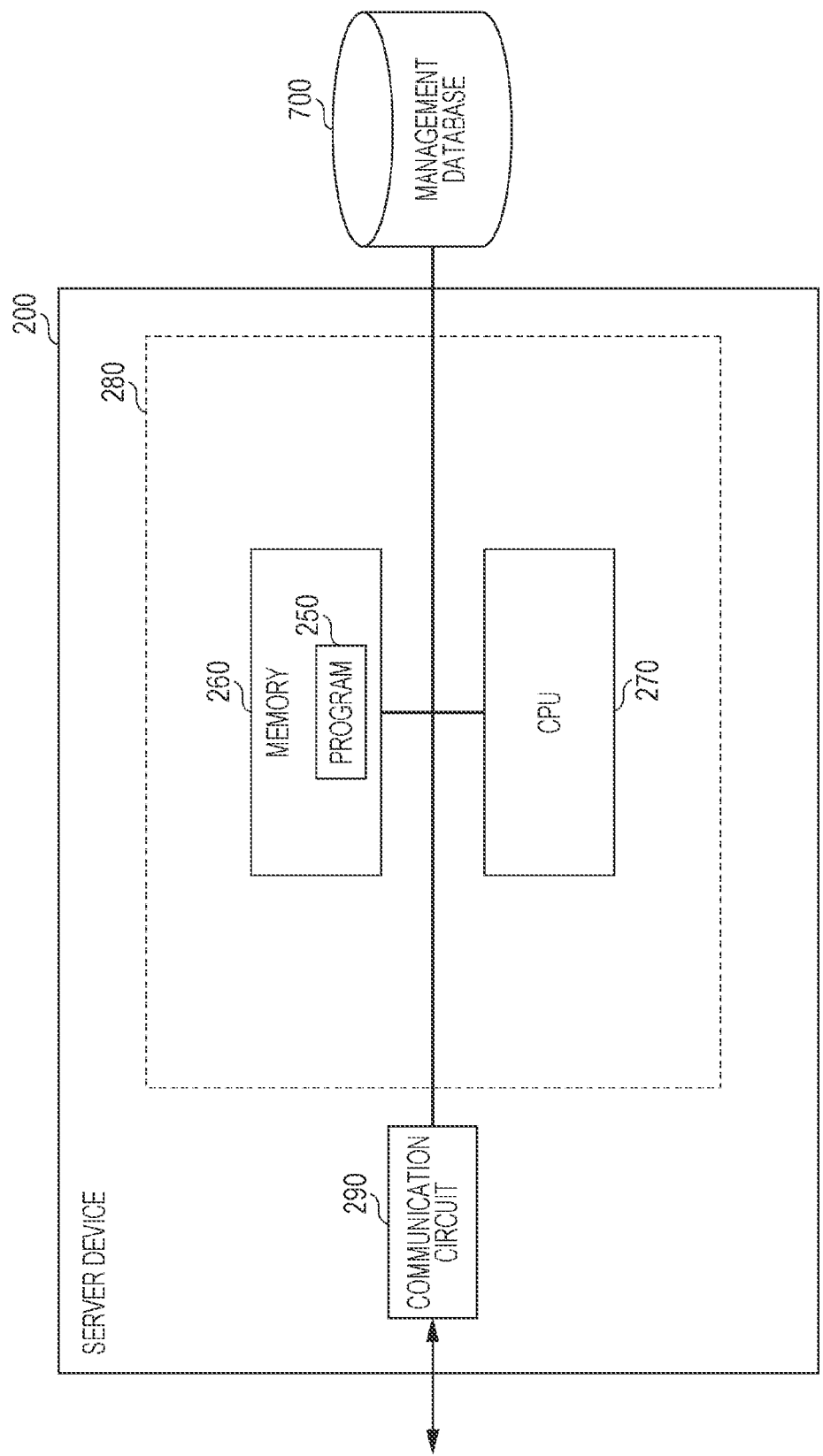

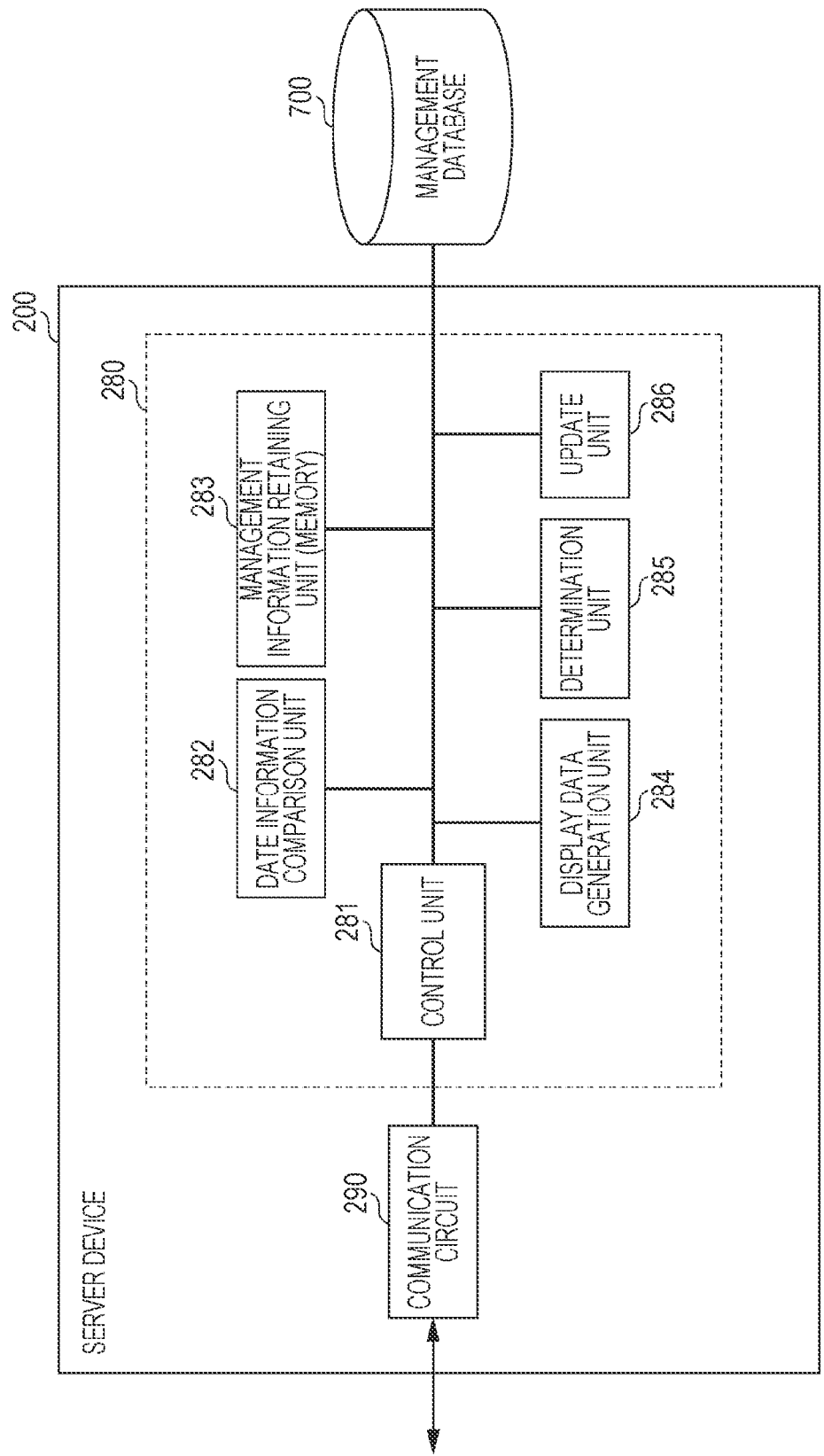

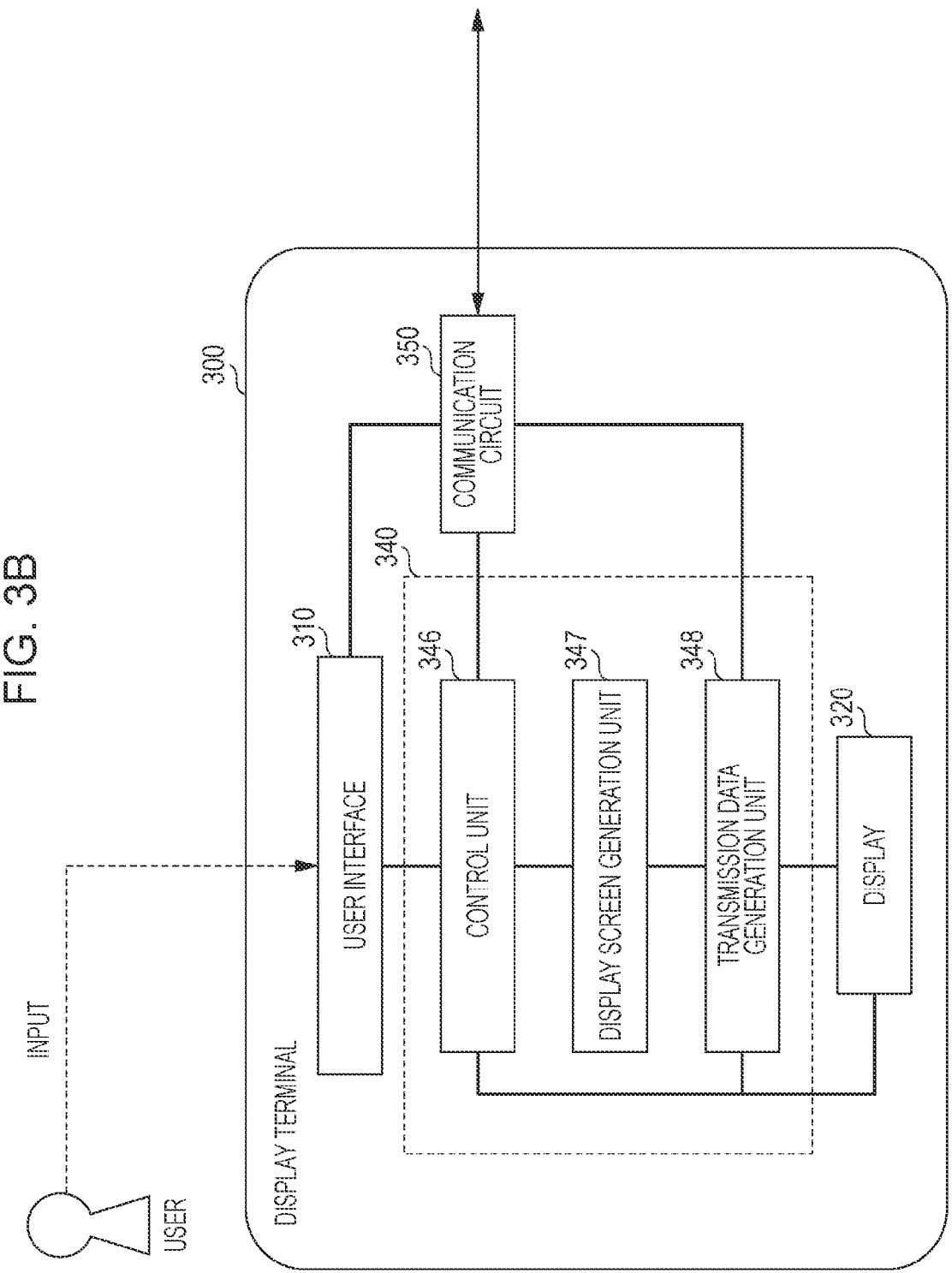

FIG. 6

| APPARATUS ID | HOME ELECTRICAL APPARATUS KIND | HOME ELECTRICAL APPARATUS HISTORY INFORMATION |
|---|---|---|
| 123456 | LIGHT | 2012:01:01:17:00:05 ON |

| 896023 | TV | 2012:01:01:18:05:12 DRAMA |
|---|---|---|

| 567890 | AIR CONDITIONER | 2012:01:01:13:20:30 ON 20°C HIGH |
|---|---|---|

2013:06:01:10:01:40
YEAR MONTH DAY HOUR MINUTE SECOND

FIG. 7

| GATEWAY ID | APPARATUS ID | HOME ELECTRICAL APPARATUS KIND | HOME ELECTRICAL APPARATUS HISTORY INFORMATION |
|---|---|---|---|
| 32456389 | 123456 | LIGHT | 2012:01:01:17:00:05 ON<br>2012:01:01:21:14:05 OFF<br>···· |
|  | 896023 | TV | 2012:01:01:18:05:12 DRAMA<br>2012:01:01:20:00:20 NEWS<br>2012:01:03:10:00:00 ANIMATION<br>2012:01:03:21:01:12 DRAMA<br>···· |
|  | 567890 | AIR CONDITIONER | 2012:01:01:13:20:30 ON 20°C HIGH<br>2012:01:01:15:15:30 OFF<br>···· |
|  | ···· | ···· |  |

FIG. 8

| GATEWAY ID | APPARATUS ID | HOME ELECTRICAL APPARATUS KIND |
|---|---|---|
| 32456389 | 123456 | LIGHT |
|  | 896023 | TV |
|  | 567890 | AIR CONDITIONER |
|  | .... | .... |
| 32456390 | 123457 | LIGHT |
|  | 896024 | TV |
|  | .... | .... |

FIG. 9

| PROVISION DESTINATION COMPANY | HOME ELECTRICAL APPARATUS KIND | PROVISION LOG KIND | PURPOSE OF USE |
|---|---|---|---|
| COMPANY A | LIGHT | LIGHTING TIME | BEHAVIOR ANALYSIS |
| | TV | VIEW HISTORY | BEHAVIOR ANALYSIS VIEW HISTORY ANALYSIS |
| | AIR CONDITIONER | OPERATING HISTORY | BEHAVIOR ANALYSIS POWER CONSUMPTION SURVEY |
| | .... | .... | |
| COMPANY B | WASHING MACHINE | OPERATING MODE | HOUSEKEEPING TENDENCY ANALYSIS |
| | TV | VIEWING POSITION INSTALLATION POSITION INFORMATION | REGIONAL VIEW HISTORY ANALYSIS |
| | .... | .... | .... |

FIG. 10

| GATEWAY ID | APPARATUS ID | LOG PROVISION PERMISSIBILITY | LOG PROVISION STATUS | PROVISION DESTINATION COMPANY | HOME ELECTRICAL APPARATUS KIND | PROVISION LOG KIND | PURPOSE OF USE | PROVISION END DATE | PROVISION RESUMPTION DATE |
|---|---|---|---|---|---|---|---|---|---|
| 3245 6389 | 123456 | PERMISSION | PROVIDING | COMPANY L | LIGHT | LIGHTING TIME | BEHAVIOR ANALYSIS | | |
| | 567890 | PERMISSION | PROVIDING | COMPANY M | AIR CONDITIONER | CONTINUOUS ENERGIZATION TIME | BEHAVIOR ANALYSIS | | |
| | 234567 | PERMISSION | PROVIDING | COMPANY A | MICROWAVE | OPEN-CLOSE LOG | HOUSEKEEPING TENDENCY ANALYSIS | | |
| | 678901 | PERMISSION | PROVIDING | COMPANY A | REFRIGERATOR | OPEN-CLOSE LOG | | | |
| | 678901 | PERMISSION | PROVIDING | COMPANY A | REFRIGERATOR | PHOTOGRAPH OF INTERNAL PORTION | ANALYSIS OF USE STATE OF REFRIGERATOR IN ACCORDANCE WITH MALE OR FEMALE | 2013.03.05 | |
| | 678901 | REFUSAL | PROVIDING | COMPANY B | REFRIGERATOR | OPEN-CLOSE LOG SEX OF USER | | | |
| | 896023 | REFUSAL | PROVISION STOPPED | COMPANY C | TV | VIEW HISTORY INSTALLATION POSITION INFORMATION | REGIONAL VIEW HISTORY ANALYSIS | | |
| | ... | | | | | | | | |

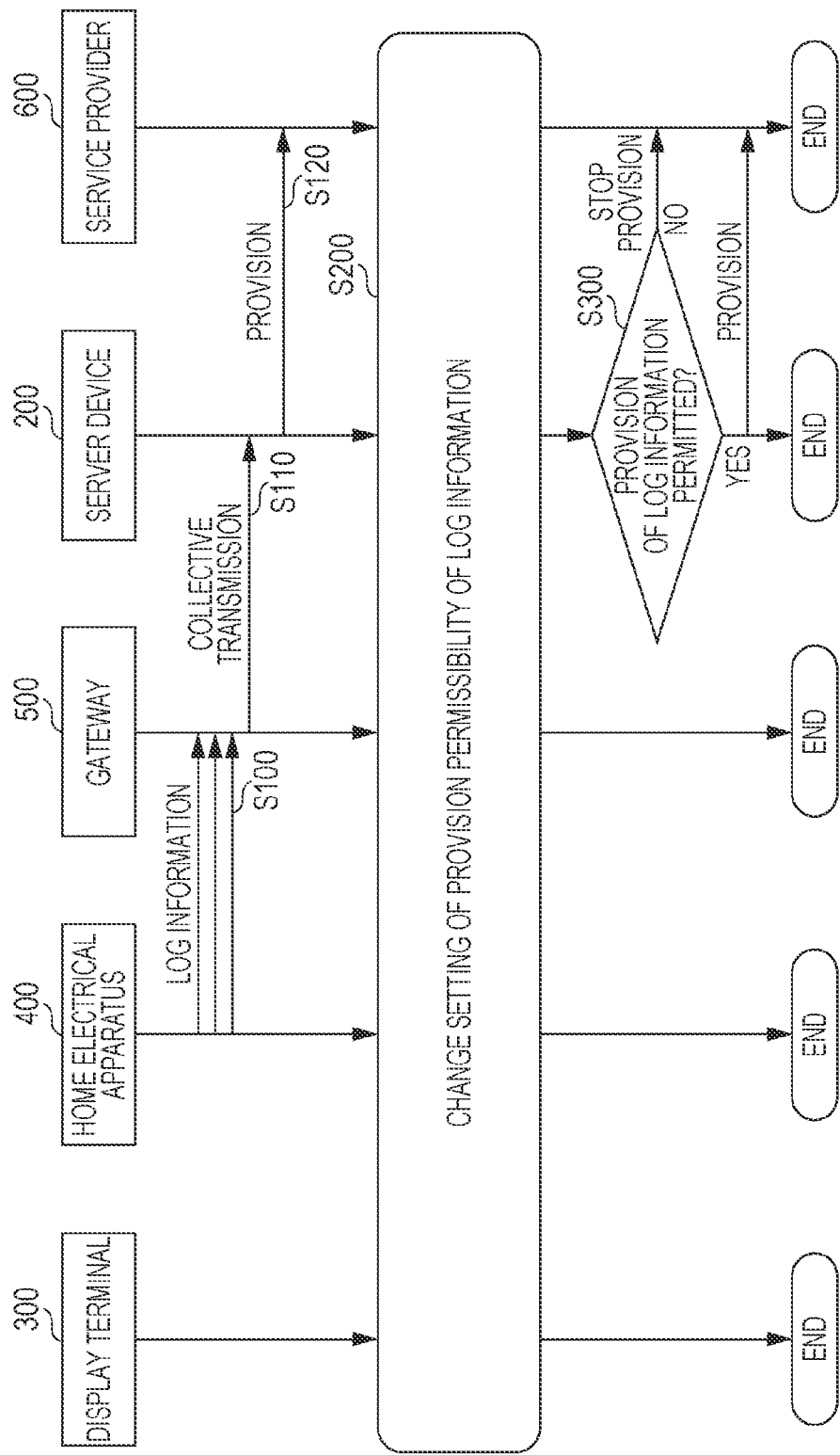

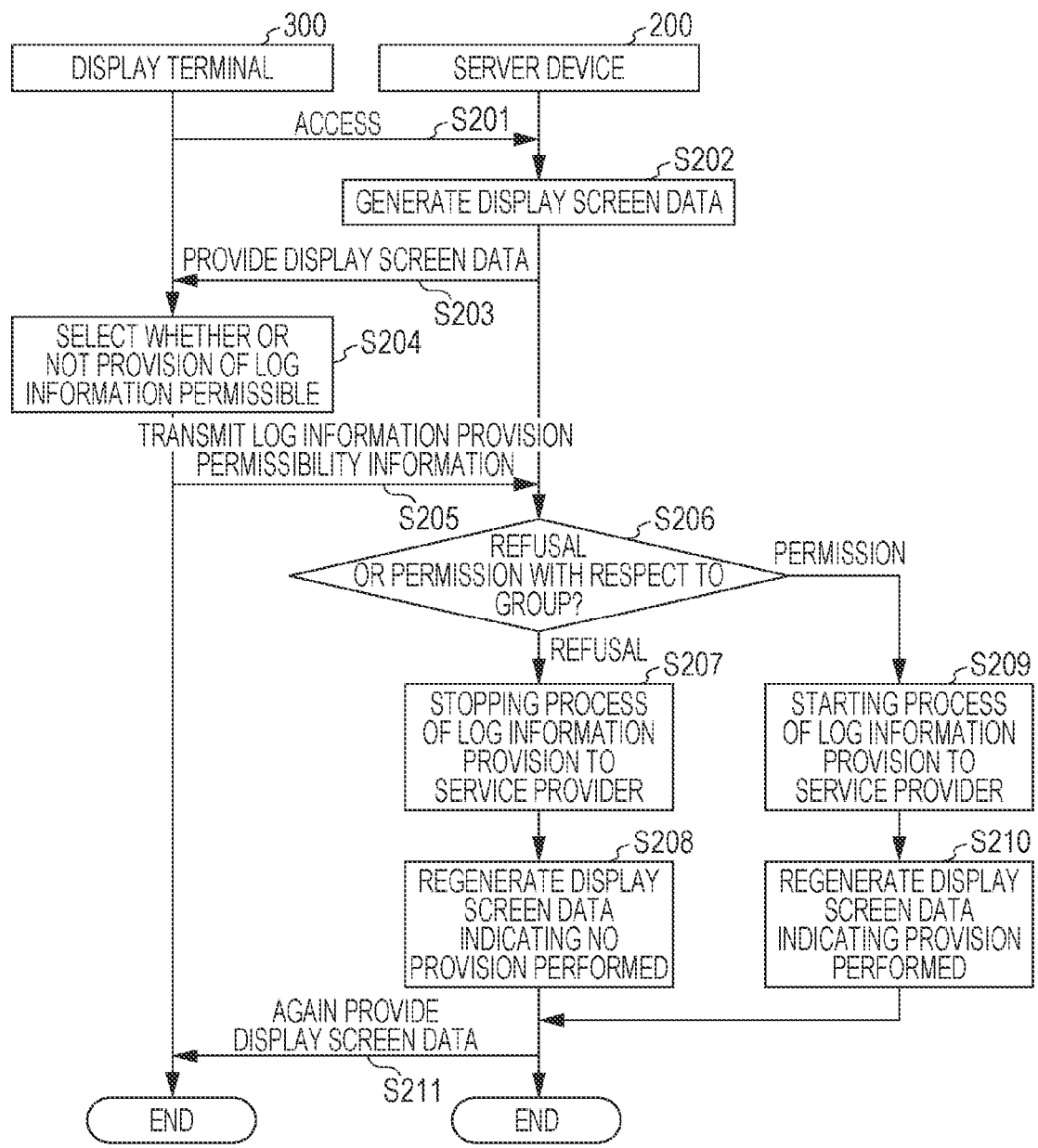

FIG. 13

| Category | New Provision Start Date | Refuse to Provide | Resume Providing | Provision Destination Company | Home Electrical Apparatus Kind | Provision Log Kind | Purpose of Use | Provision End Date | Provision Resumption Date |
|---|---|---|---|---|---|---|---|---|---|
| Providing | 2013.03.01 | ○ | | Company L | Light | Lighting time | Behavior analysis | | |
| | | ○ | | Company M | Air Conditioner | Continuous energization time | Behavior analysis | | |
| | | ○ | | Company A | Microwave | Open-close log | | | |
| | | ○ | | Company A | Refrigerator | Open-close log | Housekeeping tendency analysis | | |
| | | ○ | | Company A | Refrigerator | Photograph of internal portion | | | |
| Waiting for effective date | | ● | ○ | Company B | Refrigerator | Open-close log Sex of user | Analysis of use state of refrigerator in accordance with male or female | 2013.03.05 | |
| Provision Stopped | | | ○ | Company C | TV | View history Installation position information | Regional view history analysis | Done (End date 2013.02.25) | |
| ・・ | | | | | | | | | |

[UPDATE] 130

FIG. 18

(1) MANAGEMENT INFORMATION (BEFORE PROVISION PERMISSIBILITY UPDATE)

| GATEWAY ID | APPARATUS ID | LOG PROVISION PERMISSIBILITY | LOG PROVISION STATUS | PROVISION DESTINATION COMPANY | HOME ELECTRICAL APPARATUS KIND | PROVISION LOG KIND | PURPOSE OF USE | PROVISION END DATE | PROVISION RESUMPTION DATE |
|---|---|---|---|---|---|---|---|---|---|
| 3245 | 123456 | PERMISSION | PROVIDING | COMPANY L | LIGHT | LIGHTING TIME | BEHAVIOR ANALYSIS | | |
| 6389 | .. | | | | | | | | |

⇩

(2) MANAGEMENT INFORMATION (AFTER PROVISION PERMISSIBILITY UPDATE)

| GATEWAY ID | APPARATUS ID | LOG PROVISION PERMISSIBILITY | LOG PROVISION STATUS | PROVISION DESTINATION COMPANY | HOME ELECTRICAL APPARATUS KIND | PROVISION LOG KIND | PURPOSE OF USE | PROVISION END DATE | PROVISION RESUMPTION DATE |
|---|---|---|---|---|---|---|---|---|---|
| 3245 | 123456 | REFUSAL | PROVIDING | COMPANY L | LIGHT | LIGHTING TIME | BEHAVIOR ANALYSIS | 2013.03.15 | |
| 6389 | .. | | | | | | | | |

⇩

(3) MANAGEMENT INFORMATION (AFTER PROVISION END DATE PASSED)

| GATEWAY ID | APPARATUS ID | LOG PROVISION PERMISSIBILITY | LOG PROVISION STATUS | PROVISION DESTINATION COMPANY | HOME ELECTRICAL APPARATUS KIND | PROVISION LOG KIND | PURPOSE OF USE | PROVISION END DATE | PROVISION RESUMPTION DATE |
|---|---|---|---|---|---|---|---|---|---|
| 3245 | 123456 | REFUSAL | PROVISION STOPPED | COMPANY L | LIGHT | LIGHTING TIME | BEHAVIOR ANALYSIS | | |
| 6389 | .. | | | | | | | | |

FIG. 19

(1) DISPLAY SCREEN EXAMPLE (REPORTING)

| CATEGORY | NEW PROVISION START DATE | REFUSE TO PROVIDE | RESUME PROVIDING | PROVISION DESTINATION COMPANY | HOME ELECTRICAL APPARATUS KIND | PROVISION LOG KIND | PURPOSE OF USE | PROVISION END DATE | PROVISION RESUMPTION DATE |
|---|---|---|---|---|---|---|---|---|---|
| REPORTING | 2013.03.01 | ● | | COMPANY L | LIGHT | LIGHTING TIME | BEHAVIOR ANALYSIS | | |
| | 2013.03.01 | ○ | | COMPANY M | AIR CONDITIONER | CONTINUOUS ENERGIZATION TIME | BEHAVIOR ANALYSIS | | |
| PROVIDING | | ○ | | COMPANY A | MICROWAVE | OPEN-CLOSE LOG | | | |
| | | ○ | | COMPANY A | REFRIGERATOR | OPEN-CLOSE LOG | HOUSEKEEPING TENDENCY ANALYSIS | | |
| | | | | COMPANY A | REFRIGERATOR | PHOTOGRAPH OF INTERNAL PORTION | | | |
| WAITING FOR EFFECTIVE DATE | | ● | ○ | COMPANY B | REFRIGERATOR | OPEN-CLOSE LOG SEX OF USER | ANALYSIS OF USE STATE OF REFRIGERATOR IN ACCORDANCE WITH MALE OR FEMALE | 2013.03.05 | |
| PROVISION STOPPED | | | ○ | COMPANY C | TV | VIEW HISTORY INSTALLATION POSITION INFORMATION | REGIONAL VIEW HISTORY ANALYSIS | DONE (END DATE) (2013.02.25) | |
| ·· | | | | | | | | | |

UPDATE 130

FIG. 20

(2) DISPLAY SCREEN EXAMPLE (AFTER UPDATE AND BEFORE PROVISION END DATE)

| CATEGORY | NEW PROVISION START DATE | REFUSE TO PROVIDE | RESUME PROVIDING | PROVISION DESTINATION COMPANY | HOME ELECTRICAL APPARATUS KIND | PROVISION LOG KIND | PURPOSE OF USE | PROVISION END DATE | PROVISION RESUMPTION DATE |
|---|---|---|---|---|---|---|---|---|---|
| PROVIDING | 2013.03.01 | ○ | | COMPANY M | AIR CONDITIONER | CONTINUOUS ENERGIZATION TIME | BEHAVIOR ANALYSIS | | |
| | | ○ | | COMPANY A | MICROWAVE | OPEN-CLOSE LOG | | | |
| | | ○ | | COMPANY A | REFRIGERATOR | OPEN-CLOSE LOG | HOUSEKEEPING TENDENCY ANALYSIS | | |
| | | ○ | | COMPANY A | REFRIGERATOR | PHOTOGRAPH OF INTERNAL PORTION | | | |
| | | ● | ○ | COMPANY B | REFRIGERATOR | OPEN-CLOSE LOG SEX OF USER | ANALYSIS OF USE STATE OF REFRIGERATOR IN ACCORDANCE WITH MALE OR FEMALE | 2013.03.05 | |
| WAITING FOR EFFECTIVE DATE | 2013.03.01 | ● | ○ | COMPANY L | LIGHT | LIGHTING TIME | BEHAVIOR ANALYSIS | 2013.03.15 | |
| PROVISION STOPPED | | | ○ | COMPANY C | TV | VIEW HISTORY INSTALLATION POSITION INFORMATION | REGIONAL VIEW HISTORY ANALYSIS | DONE (END DATE) (2013.02.25) | |
| ⋯ | | | | | | | | | |

UPDATE 130

FIG. 21

(3) DISPLAY SCREEN EXAMPLE (AFTER PROVISION END DATE PASSED)

| CATEGORY | NEW PROVISION START DATE | REFUSE TO PROVIDE | RESUME PROVIDING | PROVISION DESTINATION COMPANY | HOME ELECTRICAL APPARATUS KIND | PROVISION LOG KIND | PURPOSE OF USE | PROVISION END DATE | PROVISION RESUMPTION DATE |
|---|---|---|---|---|---|---|---|---|---|
| PROVIDING | 2013.03.01 | ○ | | COMPANY M | AIR CONDITIONER | CONTINUOUS ENERGIZATION TIME | BEHAVIOR ANALYSIS | | |
| | | ○ | | COMPANY A | MICROWAVE | OPEN-CLOSE LOG | | | |
| | | ○ | | COMPANY A | REFRIGERATOR | OPEN-CLOSE LOG | HOUSEKEEPING TENDENCY ANALYSIS | | |
| | | ○ | | COMPANY A | REFRIGERATOR | PHOTOGRAPH OF INTERNAL PORTION | | | |
| | | ● | ○ | COMPANY L | LIGHT | LIGHTING TIME | BEHAVIOR ANALYSIS | DONE (END DATE 2013.03.15) | |
| | | | ○ | COMPANY B | REFRIGERATOR | OPEN-CLOSE LOG SEX OF USER | ANALYSIS OF USE STATE OF REFRIGERATOR IN ACCORDANCE WITH MALE OR FEMALE | DONE (END DATE 2013.03.05) | |
| | | | ○ | COMPANY C | TV | VIEW HISTORY INSTALLATION POSITION INFORMATION | REGIONAL VIEW HISTORY ANALYSIS | DONE (END DATE 2013.02.25) | |
| PROVISION STOPPED | | | | | | | | | |
| ... | | | | | | | | | |

UPDATE ~130

FIG. 24

(1) MANAGEMENT INFORMATION (BEFORE PROVISION PERMISSIBILITY UPDATE)

| GATEWAY ID | APPARATUS ID | LOG PROVISION PERMISSIBILITY | LOG PROVISION STATUS | PROVISION DESTINATION COMPANY | HOME ELECTRICAL APPARATUS KIND | PROVISION LOG KIND | PURPOSE OF USE | PROVISION END DATE | PROVISION RESUMPTION DATE |
|---|---|---|---|---|---|---|---|---|---|
| 3245 | 123456 | REFUSAL | PROVISION STOPPED | COMPANY L | LIGHT | LIGHTING TIME | BEHAVIOR ANALYSIS | | |
| 6389 | .. | | | | | | | | |

⇩

(2) MANAGEMENT INFORMATION (AFTER PROVISION PERMISSIBILITY UPDATE)

| GATEWAY ID | APPARATUS ID | LOG PROVISION PERMISSIBILITY | LOG PROVISION STATUS | PROVISION DESTINATION COMPANY | HOME ELECTRICAL APPARATUS KIND | PROVISION LOG KIND | PURPOSE OF USE | PROVISION END DATE | PROVISION RESUMPTION DATE |
|---|---|---|---|---|---|---|---|---|---|
| 3245 | 123456 | PERMISSION | PROVISION STOPPED | COMPANY L | LIGHT | LIGHTING TIME | BEHAVIOR ANALYSIS | | 2013.06.15 |
| 6389 | .. | | | | | | | | |

⇩

(3) MANAGEMENT INFORMATION (AFTER PROVISION END DATE PASSED)

| GATEWAY ID | APPARATUS ID | LOG PROVISION PERMISSIBILITY | LOG PROVISION STATUS | PROVISION DESTINATION COMPANY | HOME ELECTRICAL APPARATUS KIND | PROVISION LOG KIND | PURPOSE OF USE | PROVISION END DATE | PROVISION RESUMPTION DATE |
|---|---|---|---|---|---|---|---|---|---|
| 3245 | 123456 | PERMISSION | PROVIDING | COMPANY L | LIGHT | LIGHTING TIME | BEHAVIOR ANALYSIS | | |
| 6389 | .. | | | | | | | | |

FIG. 25

(1) DISPLAY SCREEN EXAMPLE (REPORTING)

| CATEGORY | NEW PROVISION START DATE | REFUSE TO PROVIDE | RESUME PROVIDING | PROVISION DESTINATION COMPANY | HOME ELECTRICAL APPARATUS KIND | PROVISION LOG KIND | PURPOSE OF USE | PROVISION END DATE | PROVISION RESUMPTION DATE |
|---|---|---|---|---|---|---|---|---|---|
| PROVIDING | 2013.03.01 | ○ | | COMPANY M | AIR CONDITIONER | CONTINUOUS ENERGIZATION TIME | BEHAVIOR ANALYSIS | | |
| | | ○ | | COMPANY A | MICROWAVE | OPEN-CLOSE LOG | | | |
| | | ○ | | COMPANY A | REFRIGERATOR | OPEN-CLOSE LOG | HOUSEKEEPING TENDENCY ANALYSIS | | |
| | | ○ | | COMPANY A | REFRIGERATOR | PHOTOGRAPH OF INTERNAL PORTION | | | |
| REPORTING | | ○ | ● | COMPANY L | LIGHT | LIGHTING TIME | BEHAVIOR ANALYSIS | | |
| PROVISION STOPPED | | | ○ | COMPANY B | REFRIGERATOR | OPEN-CLOSE LOG SEX OF USER | ANALYSIS OF USE STATE OF REFRIGERATOR IN ACCORDANCE WITH MALE OR FEMALE | DONE (END DATE) (2013.03.05) | |
| | | | ○ | COMPANY C | TV | VIEW HISTORY INSTALLATION POSITION INFORMATION | REGIONAL VIEW HISTORY ANALYSIS | DONE (END DATE) (2013.02.25) | |
| ... | | | | | | | | | |

UPDATE — 130

FIG. 26

(2) DISPLAY SCREEN EXAMPLE (AFTER UPDATE AND BEFORE PROVISION RESUMPTION DATE)

| CATEGORY | NEW PROVISION START DATE | REFUSE TO PROVIDE | RESUME PROVIDING | PROVISION DESTINATION COMPANY | HOME ELECTRICAL APPARATUS KIND | PROVISION LOG KIND | PURPOSE OF USE | PROVISION END DATE | PROVISION RESUMPTION DATE |
|---|---|---|---|---|---|---|---|---|---|
| PROVIDING | 2013.03.01 | ○ | | COMPANY M | AIR CONDITIONER | CONTINUOUS ENERGIZATION TIME | BEHAVIOR ANALYSIS | | |
| | | ○ | | COMPANY A | MICROWAVE | OPEN-CLOSE LOG | | | |
| | | ○ | | COMPANY A | REFRIGERATOR | OPEN-CLOSE LOG | HOUSEKEEPING TENDENCY ANALYSIS | | |
| | | ○ | | COMPANY A | REFRIGERATOR | PHOTOGRAPH OF INTERNAL PORTION | | | |
| WAITING FOR EFFECTIVE DATE | | ○ | ● | COMPANY L | LIGHT | LIGHTING TIME | BEHAVIOR ANALYSIS | | 2013.06.15 |
| | | | ○ | COMPANY B | REFRIGERATOR | OPEN-CLOSE LOG SEX OF USER | ANALYSIS OF USE STATE OF REFRIGERATOR IN ACCORDANCE WITH MALE OR FEMALE | DONE (END DATE) (2013.03.05) | |
| PROVISION STOPPED | | | ○ | COMPANY C | TV | VIEW HISTORY INSTALLATION POSITION INFORMATION | REGIONAL VIEW HISTORY ANALYSIS | DONE (END DATE) (2013.02.25) | |
| ⋅ ⋅ | | | | | | | | | |

UPDATE — 130

FIG. 27

(3) DISPLAY SCREEN EXAMPLE (AFTER PROVISION RESUMPTION DATE PASSED)

| CATEGORY | NEW PROVISION START DATE | REFUSE TO PROVIDE | RESUME PROVIDING | PROVISION DESTINATION COMPANY | HOME ELECTRICAL APPARATUS KIND | PROVISION LOG KIND | PURPOSE OF USE | PROVISION END DATE | PROVISION RESUMPTION DATE |
|---|---|---|---|---|---|---|---|---|---|
| PROVIDING | 2013.03.01 | ○ | | COMPANY M | AIR CONDITIONER | CONTINUOUS ENERGIZATION TIME | BEHAVIOR ANALYSIS | | |
| | | ○ | | COMPANY A | MICROWAVE | OPEN-CLOSE LOG | | | |
| | | ○ | | COMPANY A | REFRIGERATOR | OPEN-CLOSE LOG | HOUSEKEEPING TENDENCY ANALYSIS | | |
| | | ○ | | COMPANY A | REFRIGERATOR | PHOTOGRAPH OF INTERNAL PORTION | | | |
| | 2013.06.15 | ● | ○ | COMPANY L | LIGHT | LIGHTING TIME | BEHAVIOR ANALYSIS | | DONE (RESUMPTION DATE 2013.06.15) |
| | | | ○ | COMPANY B | REFRIGERATOR | OPEN-CLOSE LOG SEX OF USER | ANALYSIS OF USE STATE OF REFRIGERATOR IN ACCORDANCE WITH MALE OR FEMALE | DONE (END DATE 2013.03.05) | |
| PROVISION STOPPED | | | ○ | COMPANY C | TV | VIEW HISTORY INSTALLATION POSITION INFORMATION | REGIONAL VIEW HISTORY ANALYSIS | DONE (END DATE 2013.02.25) | |
| ・・ | | | | | | | | | |

UPDATE ~130

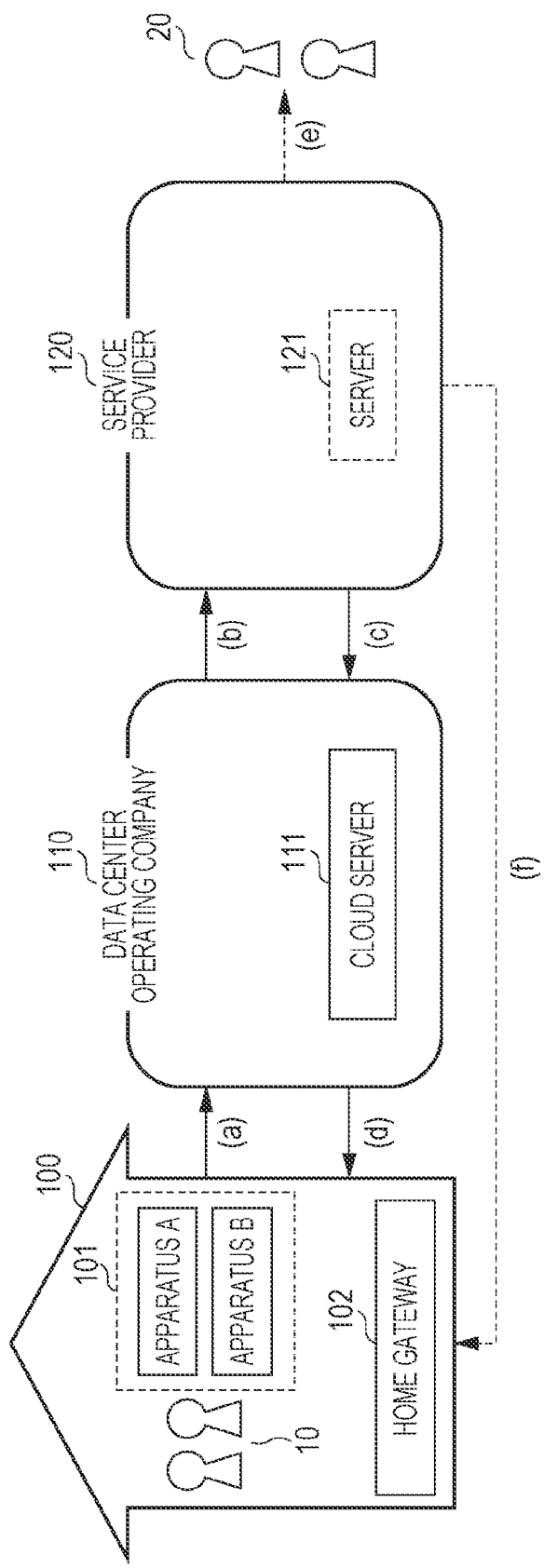

INFORMATION MANAGEMENT METHOD

CROSS REFERENCE TO RELATED APPLICATIONS

This is a continuation of U.S. patent application Ser. No. 17/189,795, filed Mar. 2, 2021, which is a continuation of U.S. patent application Ser. No. 16/355,069, filed Mar. 15, 2019 and now U.S. Pat. No. 10,965,557 issued Mar. 30, 2021, which is a continuation of U.S. patent application Ser. No. 15/673,748, filed Aug. 10, 2017 and now U.S. Pat. No. 10,284,442 issued May 7, 2019, which is a continuation of U.S. patent application Ser. No. 14/740,065, filed Jun. 15, 2015 and now U.S. Pat. No. 9,762,459 issued Sep. 12, 2017, which is a continuation of Int. Pat. Appl. No. PCT/JP2014/002544, filed May 14, 2014, which claims the benefit of Jap. Pat. Appl. No. 2013-151729, filed Jul. 22, 2013. The entire disclosure of each of the above-identified documents is incorporated herein by reference in its entirety.

BACKGROUND

1. Technical Field

The present disclosure relates to an information management method that is used in an information management system that provides services by using log information of an apparatus possessed by a user.

2. Description of the Related Art

A system has been discussed that collects log information from home electrical apparatuses of ordinary homes and provides services that use the collected log information. For example, Japanese Patent No. 4559195 mentions a maintenance support system of a home electrical apparatus. Japanese Patent No. 4206953 mentions a performance degradation evaluation system of an air conditioning unit.

Those systems collect the log information of the home electrical apparatus by directly connecting the home electrical apparatus with a computer. Meanwhile, in recent years, home electrical apparatuses, such as audiovisual apparatuses in homes, that are capable of connecting with a network have been increasing. Consequently, a system has been discussed in which a manufacturer or a service provider collects various kinds of log information including operation histories of the home electrical apparatuses such as the audiovisual apparatuses via the network. It is expected that provision of services that match lifestyles of users be enabled based on the collected log information.

SUMMARY

However, the above systems are yet to be realized, and more discussions and further improvements are needed for realization of those.

One non-limiting and exemplary embodiment provides a method of appropriately managing service providers and so forth to which a user agrees to provide log information in a system that provides log information that is collected from a home electrical apparatus to the service providers.

In one general aspect, the techniques disclosed here feature an information management method in an information management system that collects log information of a home electrical apparatus and provides information based on the log information to a computer of a service provider, the information management method including: (1) collecting the log information of one or more home electrical apparatuses of a user via a network; (2) generating display screen data that indicate a provision status of the log information of the home electrical apparatuses that correspond to service providers, the display screen data including information that configures one home electrical apparatus that is included in the one or more home electrical apparatuses, one service provider that corresponds to the one home electrical apparatus, and one kind of the log information that is output from the one home electrical apparatus as a group and displays a section by which whether or not provision of the log information is permissible is selectable with respect to the group as a unit; (3) providing the display screen data to a display terminal that performs access to the information management system via the network in response to the access to the information management system; (4) receiving information that indicates that selection of whether or not provision of one kind of the log information of one home electrical apparatus that corresponds to one service provider is permissible is performed with respect to the group as a unit in a display screen based on the display screen data from the display terminal via the network; and (5) stopping provision of the log information with respect to the group in which selection of refusal is performed in a case where a determination is made that the selection of refusal of provision of one kind of the log information of one home electrical apparatus that corresponds to one service provider is performed with respect to the group as a unit.

One aspect of the present disclosure allows a user to select whether or not to permit provision of log information with respect to a group as a unit because one kind of the log information of one home electrical apparatus that corresponds to one service provider is managed as a group. This enables realization of a further improvement in a system that collects log information of a home electrical apparatus to provide the information to service providers.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 1 is a diagram that illustrates a general image of a service providing system in a first embodiment of the present disclosure;

FIG. 2A is a block diagram that illustrates a hardware configuration of a server device;

FIG. 2B is a block diagram that illustrates a function configuration of the server device;

FIG. 3B is a block diagram that illustrates a function configuration of the display terminal;

FIG. 6 is a diagram that illustrates an example of log information that is generated by the home electrical apparatus;

FIG. 7 is a diagram that illustrates a data configuration example that is stored in a log information retaining unit in the gateway;

FIG. 8 is a diagram that illustrates a table for managing information about apparatuses of a user;

FIG. 9 is a diagram that illustrates a table for managing service providers, target home electrical apparatuses of collection of the log information, kinds of the log information, and information of purposes of use;

FIG. 10 is a diagram that illustrates a table configuration of management information;

FIG. 11 is a sequence diagram that illustrates an outline of a general operation of the system in the first embodiment;

FIG. 12 is a sequence diagram that illustrates details of an operation for changing a provision permissibility setting of the log information;

FIG. 13 is a diagram that illustrates an example of a display screen;

FIG. 18 is a diagram that illustrates a state of a change of one group of information that is contained in the management information in the first embodiment:

FIG. 19 is a first diagram that illustrates an example of a change in the display screen in the first embodiment;

FIG. 20 is a second diagram that illustrates an example of the change in the display screen in the first embodiment;

FIG. 21 is a third diagram that illustrates an example of the change in the display screen in the first embodiment;

FIG. 24 is a diagram that illustrates a state of a change of one group of information that is contained in the management information in the second embodiment;

FIG. 25 is a first diagram that illustrates an example of a change in the display screen in the second embodiment;

FIG. 26 is a second diagram that illustrates an example of the change in the display screen in the second embodiment;

FIG. 27 is a third diagram that illustrates an example of the change in the display screen in the second embodiment;

FIG. 28A is a general configuration diagram of an information management system in the present disclosure;

DETAILED DESCRIPTION

Figure 3A:
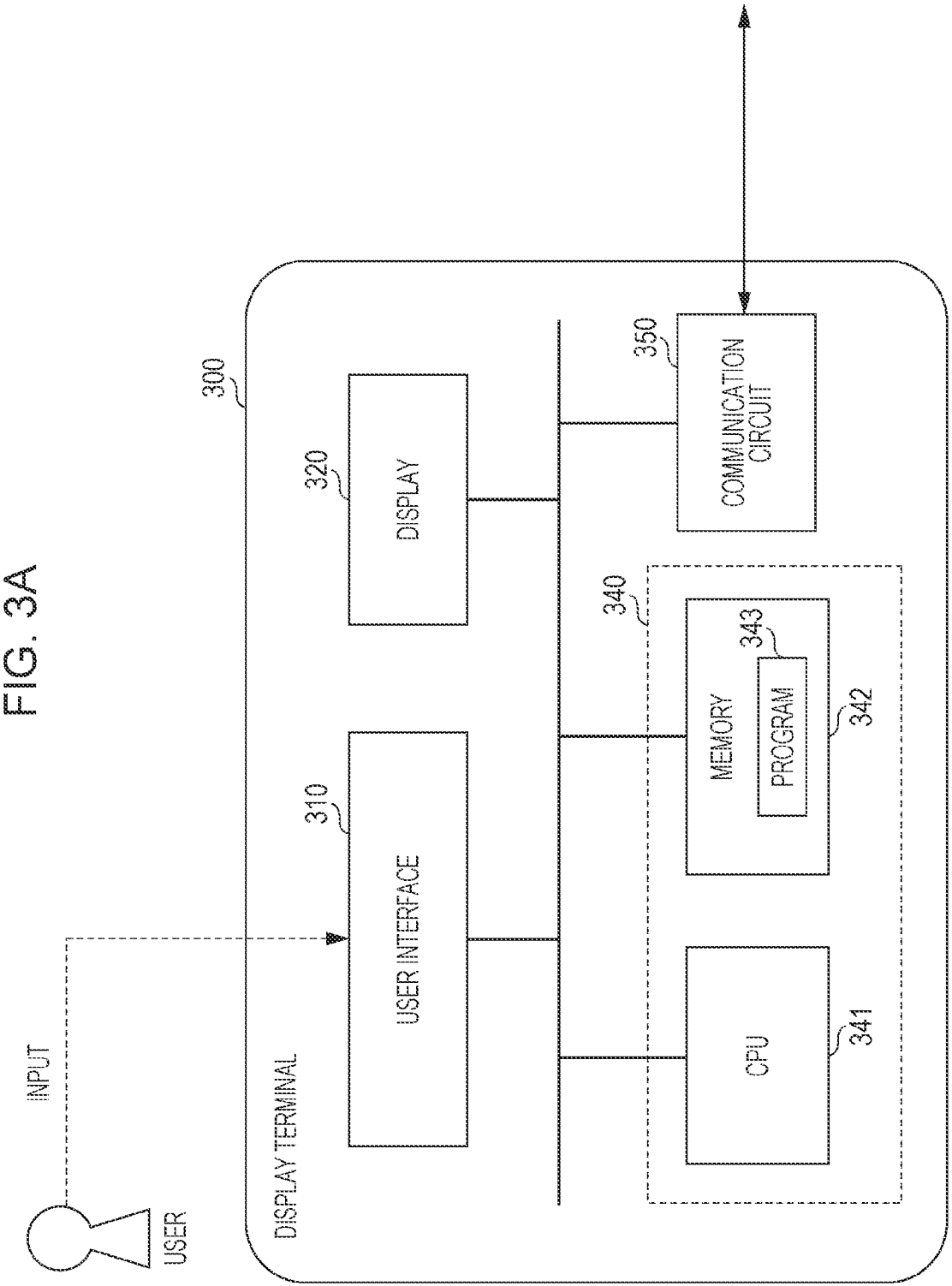
FIG. 3A is a block diagram that illustrates a hardware configuration of a display terminal.

1. Underlying Knowledge Forming Basis of the Present Disclosure

The underlying knowledge forming basis of the present disclosure will first be described.

Various kinds of log information that are collected in a system that collects log information of home electrical apparatuses to provide the log information to service providers (hereinafter also referred to as "information management system" or "service providing system") are information related to privacy of a user and thus need to be strictly dealt with. The log information may not be collected without permission, and collection and provision of an individual piece of log information to the service provider needs permission of the user.

In this case, for example, it may be assumed that some users agree to provide the log information of the home electrical apparatuses to a service provider A but do not agree to provide the log information to a service provider B, that is, the users may want to set provision permissibility with respect to each of the service providers. Further, for example, it may be assumed that some users agree to provide the log information of the TV to the service provider but do not agree to provide the log information of a refrigerator to the service provider, that is, the users may want to set the provision permissibility of the log information with respect to each of the home electrical apparatuses. Otherwise, for example, it may be assumed that some users agree to provide the log information about ON-OFF of the TV to the service provider but do not agree to provide the log information about a view history that indicates which programs the user views to the service provider, that is, the users may want to set the provision permissibility with respect to each of the kinds of the log information.

Accordingly, if the provision permissibility may individually be set with respect to each of the home electrical apparatuses, the kinds of the log information to be provided, and the service providers as provision destinations, this enables provision of the log information in accordance with the intention of the user.

However, when the provision permissibility is individually set as described above, a process of changing settings is each time performed in the home electrical apparatus or a server in the system that collects the log information. Thus, a load to the home electrical apparatus or the server may increase due to an increase in the number of processes.

Accordingly, in embodiments of the present disclosure, the service providers as the provision destinations of the log information, the home electrical apparatuses, and the kinds of the log information to be provided are managed as groups in the information management system that manages the log information that is collected from the home electrical apparatuses. Specifically, display screen data that contain sections by which the user may select whether or not to refuse to provide the log information to the service provider with respect to this group as a unit and that indicates a provision status of the log information of the home electrical apparatuses are provided to a display terminal that accesses the information management system. That is, information that indicates whether or not the user refuses to provide one kind of log information that corresponds to one home electrical apparatus to one service provider is selected on the display terminal by the group as a unit.

Accordingly, it is not necessary to notify the server in the information management system by individually specifying each of the service providers, the home electrical apparatuses, and the kinds of the log information to be provided when permissibility of provision of the log information is selected, and a notification may collectively be performed for the group as a unit. Thus, a process frequency in the server of the information management system and the display terminal may be reduced, and process loads to a network that connects the information management system with the display terminal and to the server in the information management system may also be reduced.

2. Outline of Embodiments

Outlines of embodiments of the present disclosure will hereinafter be described.

An Information management method according to one aspect of the present disclosure is an information management method in an information management system that collects log information of a home electrical apparatus and provides information based on the log information to a computer of a service provider, the information management method including: (1) collecting the log information of one or more home electrical apparatuses of a user via a network; (2) generating display screen data that indicate a provision status of the log information of the home electrical apparatuses that correspond to service providers, the display screen data including information that configures one home electrical apparatus that is included in the one or more home electrical apparatuses, one service provider that corresponds to the one home electrical apparatus, and one kind of the log information that is output from the one home electrical apparatus as a group and displays a section by which whether or not provision of the log information is permissible is selectable with respect to the group as a unit; (3) providing the display screen data to a display terminal that performs access to the information management system via the network in response to the access to the information management system; (4) receiving information that indicates that selection of whether or not provision of one kind of the log information of one home electrical apparatus that corresponds to one service provider is permissible is performed with respect to the group as a unit in a display screen based on the display screen data from the display terminal via the network; and (5) stopping provision of the log information with respect to the group in which selection of refusal is performed in a case where a determination is made that the selection of refusal of provision of one kind of the log information of one home electrical apparatus that corresponds to one service provider is performed with respect to the group as a unit.

In the aspect, the display screen data may include information that indicates the provision status of the log information with respect to the group as a unit.

In the aspect, the display screen data that is regenerated such that display is made in a display format that indicates that provision of the log information is not performed with respect to the group in which selection of refusal is performed may be provided to the display terminal via the network in a case where a determination is made that the selection of refusal of provision of the one kind of the log information of the one home electrical apparatus that corresponds to the one service provider is performed with respect to the group as a unit.

An Information management method according to another aspect of the present disclosure is an information management method in an information management system that collects log information of a home electrical apparatus and provides information based on the log information to a computer of a service provider, the information management method including: (1) collecting the log information of one or mom home electrical apparatuses of a user via a network; (2) generating display screen data that indicate a provision status of the log information of the home electrical apparatuses that correspond to service providers, the display screen data including Information that configures one home electrical apparatus that is included in the one or more home electrical apparatuses, one service provider that corresponds to the one home electrical apparatus, and one kind of the log information that is output from the one home electrical apparatus as a group and displays a provision status of the log information with respect to the group as a unit and a section by which whether or not provision of the log information is permissible is selectable with respect to the group as a unit; (3) providing the display screen data to a display terminal that performs access to the information management system via the network in response to the access to the information management system; (4) receiving information that indicates that selection of whether or not provision of one kind of the log information of one home electrical apparatus that corresponds to one service provider is permissible is performed with respect to the group as a unit in a display screen based on the display screen data from the display terminal via the network; (5) in a case where a determination is made that selection of refusal of provision of one kind of the log information of one home electrical apparatus that corresponds to one service provider is performed with respect to the group as a unit, providing the display screen data that is regenerated such that display is made in a first display format that indicates that provision of the log information is not performed with respect to the group to the display terminal via the network in a case where a determination is made that provision of the log information is not started with respect to the group in which the selection of refusal is performed and providing, to the display terminal via the network, the display screen data that is regenerated such that display is made by a second display format which indicates that the log information is provided until the last date of a provision period of the log information that is set with respect to the group and which is different from the first display format in a case where a determination is made that provision of the log information is already started with respect to the group in which the selection of refusal is performed.

In the aspect, provision of the log information with respect to the group may be stopped after the last date of the provision period that is set with respect to the group in a case where a determination is made that provision of the log information is already started with respect to the group in which the selection of refusal is performed.

In the aspect, the display screen data that is regenerated such that display is made in a third display format which indicates that the log information is not provided with respect to the group and which is different from the second display format may be provided to the display terminal via the network in a case where a determination is made that the last date of the provision period is passed.

In the aspect, the first display format and the third display format may be the same display format.

In the aspect, a date information that indicates a present date and a provision start date information that indicates a date when the provision period starts with respect to the group may be managed, the date information may be compared with the provision start date information, and a determination may be made that provision of the log information with respect to the group is not started in a case where a date that is indicated by the date information is earlier than a date that is Indicated by the provision start date information.

In the aspect, the date information and the provision start date information may include Information that indicates a time.

In the aspect, a determination may be made that provision of the log information with respect to the group is not started in a case where the date that is indicated by the date information is the same as the date that is indicated by the provision start date information and a time that is indicated by the date information is earlier than a time that is Indicated by the provision start date information.

In the aspect, a date information that indicates a present date and a provision end date information that indicates the last date of the provision period with respect to the group may be managed, the date information may be compared with the provision end date information, and a determination may be made that the log information with respect to the group is provided in a case where a date that is indicated by the date information is earlier than a date that is indicated by the provision end date information after provision of the log information with respect to the group is started.

In the aspect, the date information and the provision end date information may include Information that indicates a time.

In the aspect, a determination may be made that the log information with respect to the group is provided in a case where the date that is indicated by the date information is the same as the date that is indicated by the provision end date information and a time that is indicated by the date information is earlier than a time that is indicated by the provision end date information.

In the aspect, the display screen data may include a section by which refusal of provision of the log information is selectable with respect to the group as a unit and a section by which permission is selectable, and provision of the log information with respect to the group may be resumed in a case where information that indicates that selection to permit provision of the log information is performed with respect to the group is received after provision of the log information is stopped with respect to the group in which the selection of refusal is performed.

An information management method according to another aspect of the present disclosure is an information management method in an information management system that collects log information of a home electrical apparatus and provides information based on the log information to a computer of a service provider, the information management method including: (1) collecting the log information of one or more home electrical apparatuses of a user via a network; (2) generating display screen data that indicate a provision status of the log information of the home electrical apparatuses that correspond to service providers, the display screen data which include information that configures one home electrical apparatus that is included in the one or more home electrical apparatuses, one service provider that corresponds to the one home electrical apparatus, and one kind of the log information that is output from the one home electrical apparatus as a group and displays a section by which whether or not provision of the log information is permissible is selectable with respect to the group as a unit; (3) providing the display screen data to a display terminal that performs access to the information management system via the network in response to the access to the information management system; (4) receiving information that indicates that selection of whether or not provision of one kind of the log information of one home electrical apparatus that corresponds to one service provider is permissible is performed with respect to the group as a unit in a display screen based on the display screen data from the display terminal via the network; and (5) starting provision of the log information with respect to the group in which selection of permission is performed in a case where a determination is made that the selection of permission of provision of one kind of the log information of one home electrical apparatus that corresponds to one service provider is performed with respect to the group as a unit.

In the aspect, provision of the log information may be started from a specified provision start time in a case where a determination is made that selection of permission of provision of the one kind of the log information of the one home electrical apparatus that corresponds to the one service provider is performed with respect to the group as a unit and a determination is made that a provision start time of the log information with respect to the group in which the selection of permission is performed is specified.

In the aspect, the display screen data may include information that indicates the provision status of the log information with respect to the group as a unit.

The embodiments of the present disclosure will hereinafter be described further in detail with reference to attached drawings.

It should be noted that all the embodiments described below merely illustrate specific examples of the present disclosure. Values, shapes, elements, steps, orders of steps, and so forth that are described in the following embodiments are merely illustrative and are not intended to limit techniques of the present disclosure. Further, for example, the elements that are not described in the independent claims at filing among the elements in the following embodiments will be described as arbitrary elements. Further, contents may mutually be combined in al the embodiments.

3. Definitions of Terms

In this specification, terms are defined as follows:

Home electrical apparatus: an apparatus that uses electric power for a thermal source, a light source, and a motive power source. The home electrical apparatuses are typically used in homes but may be used for business purposes. Examples of the home electrical apparatuses may include refrigerator, air conditioner, vacuum cleaner, air cleaner, TV, video recording-playback device (recorder), audio playback device, light, dryer, electric cooker, and so forth, for example.

Mobile communication apparatus: a communication apparatus that is not connected with a communication line. The mobile communication apparatuses are not limited to ones for individual users but include ones that are used for business purposes. Specifically, for example, the mobile communication apparatus is an apparatus that is capable of wireless communication such as cellular phone, smart phone, tablet terminal, PHS, laptop PC, or mobile router.

Log information: a record about process and operation that are performed by the home electrical apparatus and control of the home electrical apparatus that is performed by the user, and so forth. The log information may contain various kinds of information that may be obtained from the home electrical apparatuses such as information that indicates an operating state or an operation date and time of the home electrical apparatus. Examples of the log information include a view history of the TV, recoding programming information of the recorder, an operating date and an amount of laundry of a washing machine, an open-close date and time and an open-close frequency of the refrigerator, and so forth. The log information is not limited to information about an operation history but may be information other than the operation history such as a photograph of an internal portion of the refrigerator and the sex of the user that may be associated with the home electrical apparatuses, for example.

Log information of mobile communication apparatus: a record about a process or communication that is performed by the mobile communication apparatus or a record about movement information of the mobile communication apparatus. In a case where the mobile communication apparatus is an apparatus like the smart phone, for example, the log information of the mobile communication apparatus is a record about a process of an application that is executed by the user by using the apparatus, information of viewed web pages, a call history, and so forth. Further, in a case where the mobile communication apparatus is capable of connecting with a global positioning system (GPS), a transition record of position information of the mobile communication apparatus by using the GPS is included in the log information of the mobile communication apparatus.

User: a person that uses the service providing system, specifically, a person that uses the service providing system to receive a service based on provided log information and perform various kinds of settings about provision of the log information. Such settings may include control for selecting a service provider that is permitted by the user to use the log information of the home electrical apparatus. In an ordinary home, a householder who contracts the service providing system may be the user, for example. In business use, a company, a legal person, and a natural person that contract the service providing system may be the users. In an ordinary home, the user is a person who possesses the home electrical apparatuses that provide the log information, and a family (including the user) is persons who use the home electrical apparatuses. There are cases where the user is the same as and different from the person who uses the home electrical apparatuses. In the embodiments of the present disclosure, for convenience of description, it is assumed that the user is the same as the person who uses the home electrical apparatuses.

Display data or display screen data: arbitrary data to be displayed on a display. The data format is not limited to specific ones but may be data of an exchangeable markup language (XML) format, text data, image data, and so forth, for example. "Display data" may be numerical data that do not conform to existing data formats. In a case where the display terminal receives the numerical data to construct a user interface as a displayed target, the numerical data may be referred to as "display data" or "display screen data".

Display terminal: an information apparatus that has a function of displaying information on a display. The display terminal may be an apparatus that has a built-in display or an apparatus that causes an external display to display information. The display terminal may be smart phone, tablet terminal, cellular phone, laptop personal computer, desktop personal computer, dedicated display terminal, and so forth, for example. Other than the above, the home electrical apparatuses that are equipped with a display (refrigerator, washing machine, TV, and so forth) may be used as the display terminal, for example. Such home electrical apparatuses may not only output the log information but also perform a selection operation of the provision permissibility of the log information in the present disclosure. As described above, the display terminal may not necessarily be a portable information terminal.

Cloud server or server device: a computer or a recording medium that is communicably connected with the display terminal via the network and provides information that is necessary for the user to perform the selection operation of the provision permissibility of the log information to the display terminal. The cloud server or the server device is typically realized by a combination of a general-purpose computer and software (computer programs) that perform the above operation.

Network: a network that is configured with a telecommunication line. The networks include the Internet, leased lines, local area networks (LAN), and so forth. The network may be a combination of plural kinds of networks regardless of wired or wireless types.

4. First Embodiment 4.1. Configuration 4.1.1. General Configuration

FIG. 1 is a diagram that illustrates a general image of a service providing system in a first embodiment of the present disclosure. The service providing system includes a server device 200, a display terminal 300, at least one home electrical apparatus 400, a home gateway 500, and a computer 600 of a service provider. In the following description, for simplicity, the home gateway 500 may be referred to as "gateway 500", and the computer 600 of the service provider may be referred to as "service provider 600".

The server device 200 is a server computer that is installed in a building of a data center or a service providing company, for example. The server device 200 is configured to be capable of communicating with the display terminal 300 that is possessed by the user and the gateway 500 that is installed in a home or an office of the user via a network (NW). Further, the server device 200 is communicably connected with the service provider 600 and a management database 700.

The server device 200 manages information that is necessary for providing this service. The server device 200 collects ID information and the log information of the home electrical apparatus 400 via the network and the home gateway 500, performs necessary processes, and provides those pieces of information to the computer of the service provider 600. Further, the server device 200 provides a display screen for confirming a provision status of the log information and for setting the provision permissibility via the network to the display terminal 300 in accordance with a demand of the user via the display terminal 300. When the user performs a setting about the provision permissibility of the log information on the display screen, the server device 200 records the setting information in management information that is stored in the management database 700.

The display terminal 300 is an information terminal such as smart phone, tablet terminal, cellular phone, laptop PC, or desktop PC that is possessed by the user, for example. The display terminal 300 obtains the display screen data by a method such as logging in to a dedicated website that is provided by the server device 200 and then causes a built-in or external display to display the display screen based on the display screen data. This enables the setting of the provision permissibility of the log information by the user.

The home electrical apparatus 400 and the home gateway 500 are installed in the home or the office of the user. The home gateway 500 collects the ID information and the log information from the home electrical apparatus 400 and transmits the information to the server device 200 periodically or in accordance with a demand from the server device 200. The log information may directly be transmitted from the home electrical apparatus 400 to the server device 200 not via the gateway.

The service provider 600 receives provision of the log information of the home electrical apparatus 400 from the server device 200 and provides various services based on the log information to the user. Such services may include a service about maintenance of the apparatus, provision of information about a new product, and so forth, for example. The service provider 600 registers information about service provision for each of users in a management database 800 and thereby provides services in accordance with the users.

Configurations of elements will be described in detail below.

4.1.2. Configuration of Server Device 200

FIG. 2A is a block diagram that illustrates a hardware configuration of the server device 200. The server device 200 includes a processing circuit 280 and a communication circuit 290. The processing circuit 280 has a CPU 270 and a memory 260 that stores a program 250. Those elements are connected together by a bus and are capable of mutual supply and reception of data. The processing circuit 280 is connected with the management database 700 and is capable of obtaining and editing the management information that is stored in the management database 700. In this embodiment, the management database 700 is an external element of the server device 200 but may be an internal element of the server device 200.

The communication circuit 290 is a circuit that performs communication with other communication apparatuses (for example, the display terminal 300, the gateway 500, and the service provider 600) via the network. The communication circuit 290 performs communication that conforms to the Ethernet® standard, for example.

The CPU 270 controls an operation of the server device 200. The CPU 270 executes a command group that is described in a computer program 250 that is expanded in the memory 260. This allows the CPU 270 to realize various kinds of functions. The command group by which the server device 200 realizes an operation described below is described in the computer program 250.

The above-described computer program 250 may be recorded in a recording medium such as CD-ROM and distributed in the market as a product or may be transmitted through the telecommunication line such as the Internet. An apparatus (a PC, for example) that includes hardware illustrated in FIG. 2A reads in the computer program 250 and may thereby function as the server device 200 according to this embodiment.

The CPU 270 and the memory 260 that stores the computer program 250 may be realized as hardware such as a digital signal processor (DSP) that is a single semiconductor circuit incorporated with a computer program. Such a DSP may realize all processes performed by the CPU 270 that executes the above-described computer program 250 by a single integrated circuit. Such a DSP may be used as the processing circuit 280 instead of the CPU 270 and the memory 260 that are illustrated in FIG. 2A.

Next, a function configuration that is realized by the processing circuit 280 will be described with reference to FIG. 2B.

FIG. 2B is a block diagram that illustrates the function configuration of the server device 200. The same reference numerals are provided to elements common to FIG. 2A, and a description thereof will not be made. FIG. 2B illustrates six function blocks that are realized by the processing circuit 280. Specifically, the six function blocks are a control unit 281, a date information comparison unit 282, a management information retaining unit 283, a display data generation unit 284, a determination unit 285, and an update unit 286. The CPU 270 that executes the software functions as the date information comparison unit 282 at a certain time point and functions as the update unit 286 at another time point, for example. As described above, the CPU 270 has all the functions of the six function blocks. At least one of those six configuration blocks may be realized by hardware such as a DSP that performs a dedicated process.

The control unit 281 controls all the elements of the server device 200 and thereby executes various processes that are necessary for collection and processes of the log information, provision of the log information to the service provider, and provision of the display screen data to the display terminal 300.

The date information comparison unit 282 obtains date information that indicates a present date, provision start date information that indicates a date on which a provision period of each of the groups of the log information starts, and provision end date information that indicates the last date of the provision period of each of the groups and thereby determines the provision state of the log information based on those pieces of information. Specifically, the date information comparison unit 282 compares the provision start date information and the provision end date information in the management information that is obtained from the management database 700 by the management information retaining unit 283 described below with present date information that is obtained from a timing circuit such as a real-time clock that is not illustrated. In a case where the date indicated by the date information is earlier than the date indicated by the provision start date information, a determination is made that provision of the log information with respect to the group is not started. Further, in a case where the date indicated by the date information is earlier than the date indicated by the provision end date information after the provision is started, a determination is made that provision of the log information with respect to the group is performed. Results of those determinations are reflected in the display screen data that are generated by the display data generation unit 284.

The management information retaining unit 283 obtains the management information for managing the provision status of the log information from the management database 700 and temporarily retains the management information. As described below, the management information is information that indicates the provision status of each of the groups that contains the home electrical apparatuses, provision destination companies, and provided log kinds with respect to each of the users. The management information is generated based on information of the users, companies, and so forth that is stored in the management database 700.

The display data generation unit 284 generates the display screen data based on information about the management information that is obtained by the management information retaining unit 283 and the dates that are obtained by the date information comparison unit 282. The display screen data configure one home electrical apparatus, one service provider that corresponds to the one home electrical apparatus, and one kind of the log information that is output from the one home electrical apparatus as the group and contains information that displays a section by which the user may select whether or not provision of the log information is permissible with respect to the group as a unit. The generated display screen data are provided to the display terminal 300 via the control unit 281 and the communication circuit 290.

When information that indicates selection of whether or not provision of one kind of the log information of one home electrical apparatus that corresponds to one service provider is permissible is performed with respect to the group as a unit on the display screen based on the display screen data is transmitted from the display terminal 300, the determination unit 285 determines whether the selection indicates refusal or permission. The determination unit 285 then determines whether provision of the log information is stopped or started in accordance with a determination result.

The update unit 286 updates the management information in accordance with the determination result by the determination unit 285. For example, in a case where the setting of provision of the log information is changed from "permission" to "refusal" or from "refusal" to "permission" with respect to a certain group, the update unit 286 updates the concerned portion of the management information. In response to the update, the control unit 281 causes the communication circuit 290 to execute a notification of information that indicates the change in the setting to the service provider 600 and causes the display data generation unit 284 to update the display screen data. The control unit 281 records the management information that is updated by the update unit 286 in the management database 700.

4.1.3. Configuration of Display Terminal 300

A configuration and a function of the display terminal 300 will next be described.

FIG. 3A is a block diagram that illustrates a hardware configuration of the display terminal 300. The display terminal 300 includes a user interface 310, a display 320, a processing circuit 340, and a communication circuit 350. The processing circuit 340 has a CPU 341 and a memory 342 that stores a program 343.

The user interface 310 is a device that receives inputs from the user and may be a touch screen, hardware buttons, a keyboard, or a mouse, or a combination thereof, for example. The display 320 is a device that displays a demanded image in accordance with a command from the processing circuit 340. The display 320 may be realized by a liquid crystal display or an organic EL display, for example. In a case where a touch screen is employed as the display 320, the display 320 also includes the function of the user interface 310.

The communication circuit 350 is a circuit that communicates with other communication apparatuses (for example, the communication circuit 290 in the server device 200) via the network. The communication circuit 350 performs communication that conforms to the Ethernet® standard, for example.

The CPU 341 controls an operation of the display terminal 300. The CPU 341 executes a command group that is described in a computer program 343 that is expanded in the memory 342. This allows the CPU 341 to realize various kinds of functions. The command group by which the display terminal 300 realizes an operation described below is described in the computer program 343.

The above-described computer program 343 may be recorded in a recording medium such as CD-ROM and distributed in the market as a product or may be transmitted through the telecommunication line such as the Internet. In a case where the display terminal 300 is a smart phone or a tablet terminal, the computer program 343 may be sold or provided free of charge as an application. Other than those apparatuses, an apparatus (a PC, for example) that includes hardware illustrated in FIG. 3A reads in the computer program 343 and may thereby function as the display terminal 300 according to this embodiment.

The CPU 341 and the memory 342 that stores the computer program 343 may be realized as hardware such as a digital signal processor (DSP) that is a single semiconductor circuit incorporated with a computer program. Such a DSP may realize all processes performed by the CPU 341 that executes the above-described computer program 343 by a single integrated circuit. Such a DSP may be used as the processing circuit 340 instead of the CPU 341 and the memory 342 that are illustrated in FIG. 3A.

Next, a function configuration that is realized by the processing circuit 340 will be described with reference to FIG. 3B.

FIG. 3B is a block diagram that illustrates a function configuration of the display terminal 300. The same reference numerals are provided to elements common to FIG. 3A, and a description thereof will not be made. FIG. 3B illustrates three function blocks that are realized by the processing circuit 340. Specifically, the three function blocks are a control unit 346, a display screen generation unit 347, and a transmission data generation unit 348. The CPU 341 that executes the software functions as the display screen generation unit 347 at a certain time point and functions as the transmission data generation unit 348 at another time point, for example. That is, the CPU 341 has all the functions of the three function blocks. At least one of those three configuration blocks may be realized by hardware such as a DSP that performs a dedicated process.

The display screen generation unit 347 generates images to be displayed on the display 320. The transmission data generation unit 348 generates data to be transmitted to the network via the communication circuit 350. The control unit 346 controls the elements of the display terminal 300 and thereby executes various processes that are necessary for determinations of the home electrical apparatuses whose log information is provided and the service providers as the provision destinations.

4.1.4. Configurations of Home Electrical Apparatus 400 and Home Gateway 500

Next, configurations of the home electrical apparatus 400 and the gateway 500 will be described.

Figure 4:
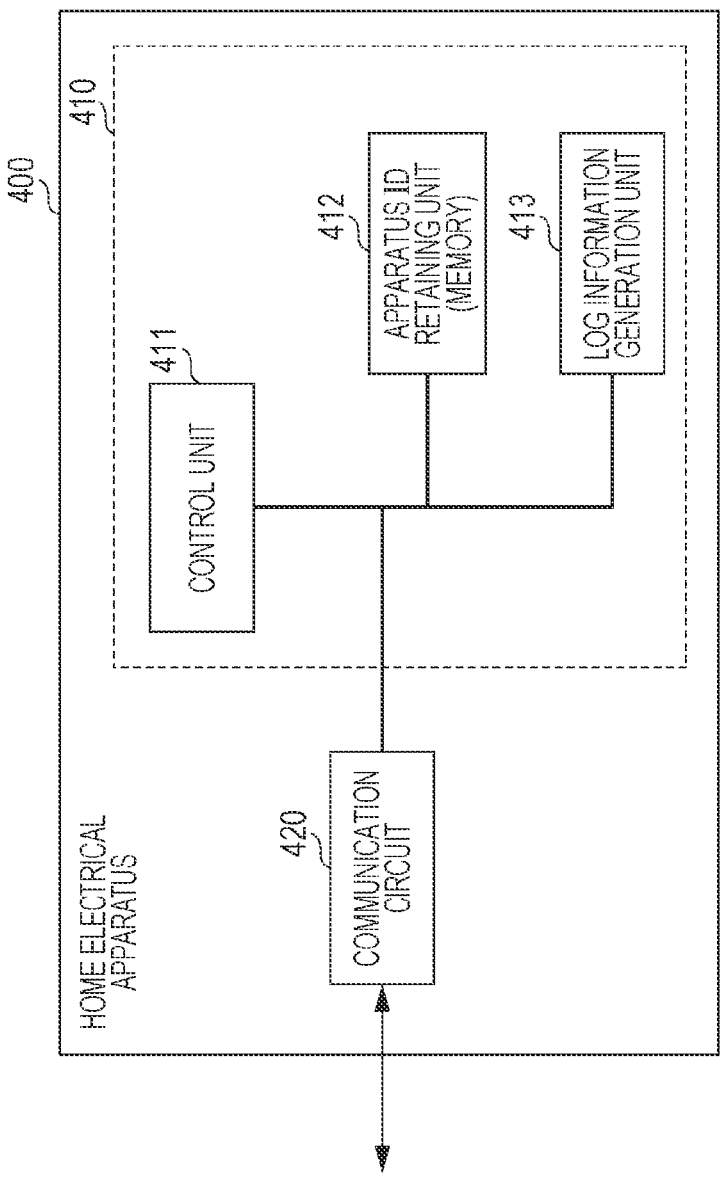
FIG. 4 is a block diagram that illustrates a configuration of a home electrical apparatus.

FIG. 4 is a block diagram that illustrates a configuration of the home electrical apparatus 400. The home electrical apparatus 400 includes a processing circuit 410 and a communication circuit 420. Although not illustrated in FIG. 4, the processing circuit 410 may be realized by a combination of a CPU and a memory that stores a program. Alternatively, the processing circuit 410 may be realized by dedicated hardware that is configured to realize the following operation. The home electrical apparatus 400 may include elements for realizing functions demanded of the apparatus other than illustrated elements.

The communication circuit 420 is a circuit that performs communication with other communication apparatuses (for example, the gateway 500, a router and a switching hub that are not illustrated, and so forth) via the network. The communication circuit 420 performs communication that conforms to the Ethernet® standard, for example. The communication circuit 420 transmits the log information and the ID information that are generated by the processing circuit 410 to the gateway 500.

FIG. 4 illustrates three function blocks that are realized by the processing circuit 410. Specifically, the three function blocks are a control unit 411, an apparatus ID retaining unit (memory) 412, and a log information generation unit 413. The control unit 411 controls an operation of the whole home electrical apparatus 400. For example, the control unit 411 instructs the log information generation unit 413 to generate the log information and instructs the communication circuit 420 to transmit the log information. The apparatus ID retaining unit 412 retains the ID information that identifies the home electrical apparatus. The log information generation unit 410 generates the log information such as Information about the operation history, an attribute of the user, and information of an installation location. There may be various kinds of log information in accordance with the apparatuses. In this embodiment, the log information is not limited to particular kinds.

A transmission timing of the log information that is generated by the log information generation unit 413 may arbitrarily be defined. For example, the control unit 411 may transmit the log information after the log information is accumulated to some extent in a memory of the apparatus ID retaining unit 412 or the like or may transmit the log information at each time when the state of the home electrical apparatus 400 changes.

Figure 5:
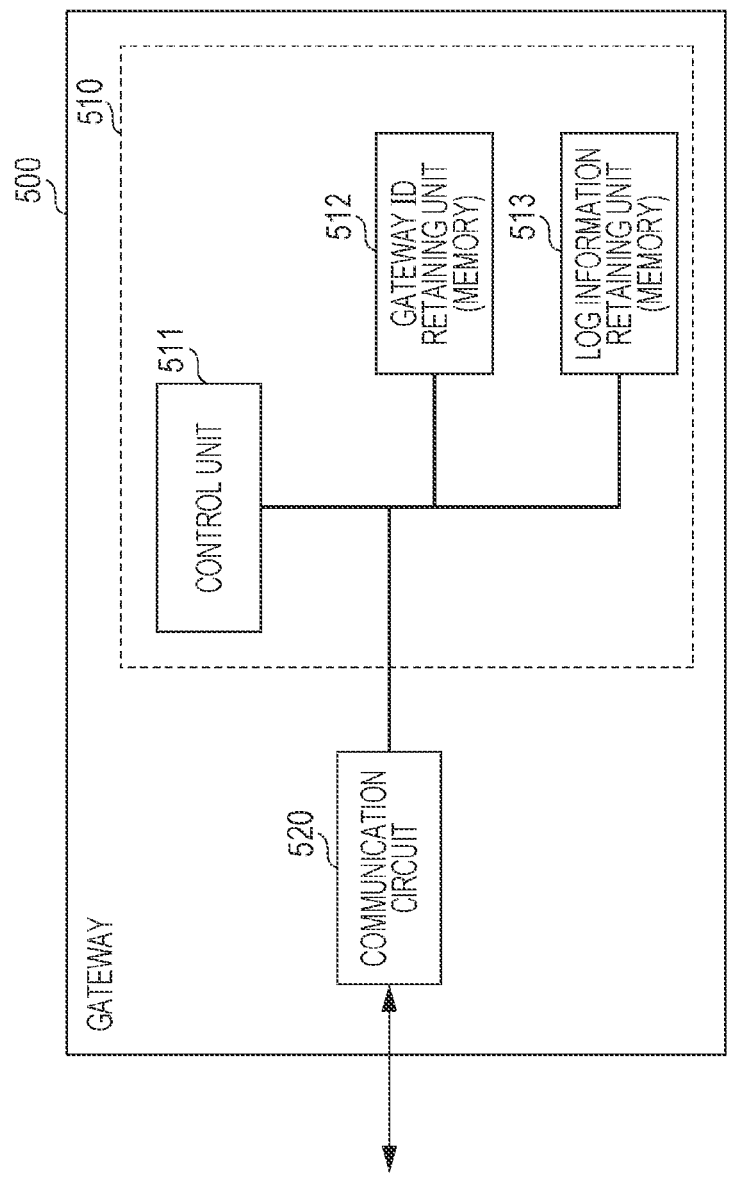
FIG. 5 is a block diagram that illustrates a configuration of a gateway.

FIG. 5 is a block diagram that illustrates a configuration of the gateway 500. The gateway 500 includes a processing circuit 510 and a communication circuit 520. Although not illustrated in FIG. 5, the processing circuit 510 may be realized by a combination of a CPU and a memory that stores a program. Alternatively, the processing circuit 510 may be realized by dedicated hardware that is configured to realize the following operation.

The communication circuit 520 is a circuit that performs communication with other communication apparatuses (for example, the home electrical apparatus 400 and the server device 200) via the network. The communication circuit 520 performs communication that conforms to the Ethernet® standard, for example. The communication circuit 520 transmits the log information and the ID information that are transmitted from the processing circuit 510 to the server device 200.

FIG. 5 illustrates three function blocks that are realized by the processing circuit 510. Specifically, the three function blocks are a control unit 511, a gateway ID retaining unit 512, and a log information retaining unit 513. The control unit 511 controls an operation of the whole gateway 500. For example, the control unit 511 determines timings of collection and transmission of the log information and provides an instruction on transmission and reception to the communication circuit 520. The gateway ID retaining unit 512 is a memory that stores a gateway ID for identifying the gateway. Because the home or office is identified by the gateway ID, the gateway ID may be considered as information that identifies the user. ID information that identifies individual users may be managed other than the gateway ID. The log information retaining unit 513 is a memory that accumulates the log information that is transmitted from the home electrical apparatus 400. In a case where plural home electrical apparatuses 400 are present, the log information of the apparatuses is collectively accumulated. The accumulated log information may be transmitted to the server device 200 via the network in accordance with a demand from the server device 200 or on a preset date and time, for example.

4.1.5. Data Configuration

Configuration examples of various data in this embodiment will next be described.

FIG. 6 is a diagram that illustrates an example of the log information that is generated by the home electrical apparatus 400. The log information in this example contains an apparatus ID, home electrical apparatus kind information, and home electrical apparatus history information. The apparatus ID is information that uniquely identifies the home electrical apparatus 400. A different value is given to a different apparatus even if this apparatus is the same kind of home electrical apparatus. The home electrical apparatus kind information is information that indicates the apparatus kind such as light, TV, air conditioner, washing machine, or refrigerator, for example. The home electrical apparatus history information is information that indicates a content of the log information such as the operation history of the apparatus. The format of the home electrical apparatus history information is predetermined. The home electrical apparatus history information may be information that indicates the date and time when a certain operation is performed and the content of the operation, for example. In the example illustrated in FIG. 6, a format is adopted in which plural numerical values that respectively indicate year, month, day, hour, minute, and second are separated by colons (:) as date and time information. Further, information that indicates operations (an "ON" control log for the light, information about views of programs such as information indicating a genre such as "drama" and titles for the TV, and control and setting logs such as "ON", "20° C.", and "high" for the air conditioner) follows the date and time information. The format of the log information is not limited to the above but may arbitrarily be defined. Such log information is transmitted from the home electrical apparatuses to the gateway 500. In a case where the gateway 500 is not provided, the above log information is directly transmitted to the server device 200.

FIG. 7 is a diagram that illustrates a data configuration example that is stored in the log information retaining unit 513 in the gateway 500. As illustrated in FIG. 7, the gateway 500 manages the apparatus IDs, the home electrical apparatus kind information, and the home electrical apparatus history information for each of the gateway IDs. The gateway 500 transmits such data to the server device 200.

FIG. 8 illustrates a table stored in the management database 700 and for managing information about the apparatuses of the user. This table represents the gateway ID that identifies the user (or the installation location), the apparatus IDs of the home electrical apparatuses whose log information is provided, and the home electrical apparatus kinds. The table may automatically be updated at each time when the server device 200 collects the log information, for example. Alternatively, the table may manually be created and updated.

FIG. 9 illustrates a table stored in the management database 700 and for managing the service providers (provision destination companies), the target home electrical apparatuses (home electrical apparatus kinds) of collection of the log information, kinds of the log information (provision log kinds), and information of purposes of use. The table is created by the server device 200.

FIG. 10 illustrates a table configuration of the management information that is stored in the management database 700. The management information in this example contains information of the gateway ID, the apparatus IDs, log provision permissibility, log provision statuses, the provision destination companies, the home electrical apparatus kinds, the provision log kinds, the purposes of use, provision end dates, and provision start dates. The server device 200 generates such management information by combining the above two tables that are stored in the management database 700. The management information may be configured in any format as long as the home electrical apparatuses of each of the users, the service providers that correspond to the home electrical apparatuses, and the kinds of the log information are set as groups and the provision permissibility of each of the groups is managed. The server device 200 generates the display screen data that are transmitted to the display terminal 300 based on such management information.

4.2. Operation

4.2.1. Outline of General Operation

Next, an information management system in this embodiment will be described.

FIG. 11 is a sequence diagram that illustrates an outline of a general operation of the system. Here, a case is assumed where the selection of whether or not provision of the log information is permissible is performed after the operation of collection and provision of the log information.

First, in step S100, the home electrical apparatus 400 transmits the log information to the gateway 500. The log information may be transmitted from the plural home electrical apparatuses 400 to the gateway 500 in plural times, for example. In following step S110, the gateway 500 collectively transmits pieces of the collected log information to the server device 200. This transmission may be performed in a prescribed frequency such as once a day or once a week, for example. Alternatively, the transmission may be performed at a point when a demand of the log information is provided from the server device 200. Further, the transmission may be performed each point when a log is produced in order to immediately providing the service in accordance with a control log. In next step S120, the server device 200 provides the collected log information to the service provider 600. In FIG. 11, only the single service provider 600 is illustrated as an example. However, in a case where plural service providers that receive provision of the log information are present, necessary log information is transmitted to the service providers. In this case, the server device 200 determines which log information is transmitted to which service provider based on the management information Illustrated in FIG. 10. Operations of steps S100 to S120 may periodically or not periodically be performed.

In the example illustrated in FIG. 11, subsequently in step S200, an operation of a setting change of the provision permissibility of the log information is performed. In step S200, the display terminal 300 and the server device 200 performs an operation necessary for changing the setting of the provision permissibility of the log information. Specifically, in response to access by the user by using the display terminal 300, the server device 200 transmits the display screen data for the setting change to the display terminal 300. The user selects whether or not provision of the log information is permissible with respect to the group as a unit that is defined by the home electrical apparatus, the service provider, and the kind of the log information by a screen that is displayed based on the display screen data. When the server device 200 receives information that indicates a selection content of the provision permissibility with respect to the group as a unit, the server device 200 performs a setting change process, regenerates the display screen data, and transmits the display screen data to the display terminal 300.

When the change of the setting of the provision permissibility of the log information is completed, the server device 200 determines whether or not provision of the log information is permitted with respect to each of the groups in step S300 when the server device 200 transmits the log information to the service provider 600. The group with permission provides the log information to the service provider 600, and the group without permission does not provide the log information to the service provider 600.

The operation in step S200 in FIG. 11 will be described in detail below.

FIG. 12 is a sequence diagram that illustrates details of the operation in step S200 for changing a provision permissibility setting of the log information. The display terminal 300 first accesses the server device 200 by control by the user (step S201). Here, "access" means demanding the display screen data from the server device 200. Accessing the server device 200 may also be referred to as "accessing the information management system". Access to the server device 200 may be performed by logging in of the user to a dedicated web page that is provided by the server device 200, for example. When the server device 200 receives the demand from the display terminal 300, the server device 200 generates the display screen data based on the management information (step S202). The server device 200 may in advance generate the display screen data prior to step S201. The server device 200 transmits the display screen data to the display terminal 300 (step S203). The display terminal 300 displays the display screen based on the display screen data on the display.

FIG. 13 is a diagram that illustrates an example of the display screen that is displayed in this case. The display screen contains information that indicates the provision status with respect to each of the groups that is configured with the service provider (provision destination company), the home electrical apparatus (home electrical apparatus kind), and the kind of the log information (provision log kind). The provision status contains information of categories such as providing, waiting for effective date, and provision stopped and date information such as a new provision start date, the provision end date, and a provision resumption date. The display screen further contains the sections by which the user may select whether or not provision of the log information is permissible with respect to each of the group ("refuse to provide" section and "resume providing" section). Those sections are displayed in a format of a checkbox and are configured such that "refuse to provide" may be selected for the group that is providing the log information and "resume providing" may be selected for the group in which the provision is stopped. The group for which either one of "refuse to provide" and "resume providing" is selected but the selection is yet to be effective obtains a status of "waiting for effective date", in which either one of "refuse to provide" and "resume providing" may be selected.

The configuration of the display screen may be different from the one illustrated in FIG. 13. For example, only a portion of information illustrated in FIG. 13 may be displayed. Further, display and non-display of some items may be switched by selection of the user. The configuration of the display screen may arbitrarily designed as long as the display screen configures one home electrical apparatus, one service provider that corresponds to the one home electrical apparatus, and one kind of the log information that is output from the one home electrical apparatus as the group and contains a section by which the user may select whether or not provision of the log information is permissible with respect to the group as a unit.

Such a display screen allows the user to change the setting of the provision permissibility of the log information. The change of the setting is realized by entering a check mark in the checkbox of the section of "refuse to provide" or "resume providing" and pressing an update button 130. This operation causes the display terminal 300 to transmit information that indicates that the setting of permissibility of log information provision is changed with respect to each of the groups to the server device 200 (step S205).

When the server device 200 receives the information, the server device 200 determines which of refusal or permission is selected with respect to each of the groups in which the setting is changed (step S206). A process of stopping provision of the log information to the service provider is performed for the group in which refusal is selected (step S207). Specifically, the server device 200 updates the management information illustrated in FIG. 10 and notifies the service provider of the change of the setting. The server device 200 thereafter regenerates the display screen data that indicate that the log information is not provided with respect to the group (step S208).

On the other hand, a process of starting provision of the log information to the service provider is performed for the group in which permission is selected in step S206 (step S209). Specifically, the server device 200 updates the management information illustrated in FIG. 10 and notifies the service provider of the change of the setting. The server device 200 thereafter regenerates the display screen data that indicate that the log information is provided with respect to the group (step S210).

The server device 200 next transmits (again provides) the regenerated display screen data to the display terminal 300 (step S211). Accordingly, the display terminal 300 displays the display screen based on the display screen data on the display. The screen that is displayed in this case is a screen in which the category is changed to "waiting for effective date" and a date is added to the section of "provision end date" or "provision resumption date" with respect to the group in which the selection of whether or not provision is permissible is performed, for example.

4.2.2. Example of Operation in Case of Refusal of Provision

Next, a description will be made particularly about a case where the provision permissibility is changed from "permission" to "refusal" among operations of changing the provision permissibility of the log information.

Figure 14:
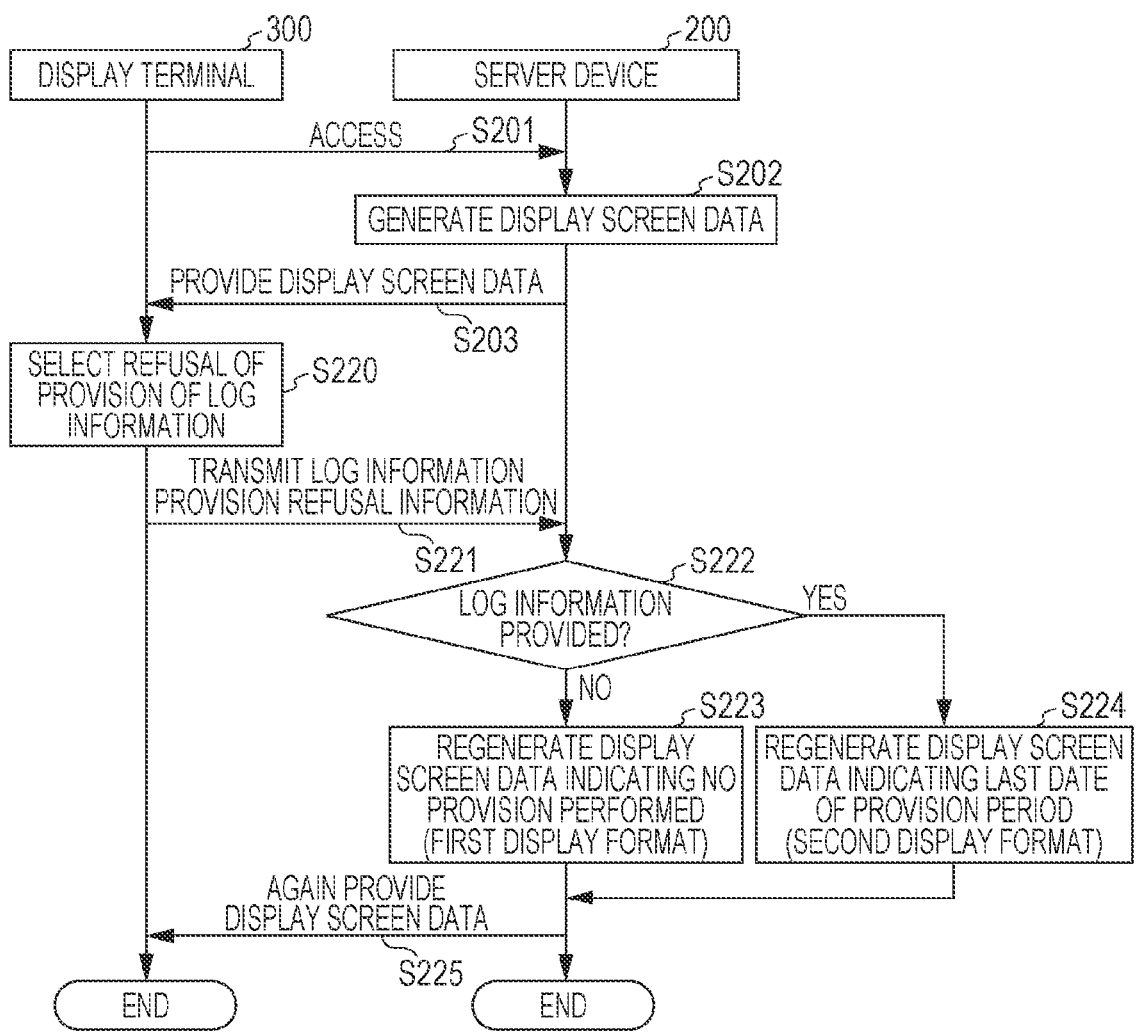
FIG. 14 is a sequence diagram that illustrates an example of an operation of the system in the first embodiment.

FIG. 14 is a sequence diagram that illustrates an example of an operation in which a determination is made whether or not the log information is provided when refusal of provision of the log information is selected and the display data of different display formats are generated in accordance with the determination results. The operations of steps S201 to S203 are the same as the corresponding operations in FIG. 12. In this example, the display terminal 300 selects refusal of provision of the log information with respect to a specified group in response to control by the user (step S220). The display terminal 300 then transmits information that indicates that the user refuses to provide the log information with respect to the group (step S221).

When the server device 200 receives the information, the server device 200 determines whether or not the group is in a state where the log information is provided at a present point (step S222). If the group is not in the state where the log information is provided, the server device 200 regenerates the display screen data that indicate that the log information is again not provided (step S223). The display format based on such display screen data with respect to the group will be referred to as "frst display format". On the other hand, in a case where a determination is made that the group is in the state where the log information is provided, the server device 200 regenerates the display screen data that indicate the last date of the provision period (step S224). The display format based on such display screen data with respect to the group will be referred to as "second display format". The server device 200 thereafter transmits (again provides) the display screen data to the display terminal 300 (step S225).

Figure 15:
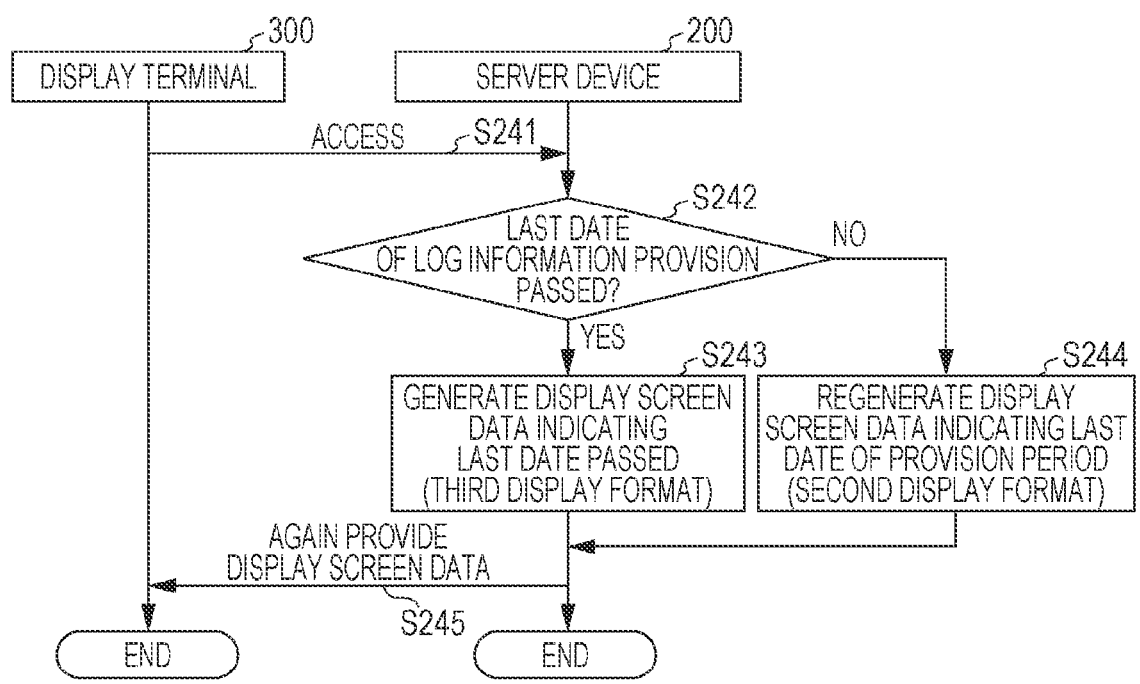
FIG. 15 is a sequence diagram that illustrates another example of the operation of the system in the first embodiment.

FIG. 15 is a sequence diagram that illustrates an operation example in a case where the display terminal 300 again accesses the server device 200 after a process of step S224 is performed in FIG. 14. The display terminal 300 first accesses the server device 200 and demands the display screen data (step S241). The server device 200 determines whether or not the last date of the provision period of the log information that is set for the group is passed at a present date (step S242). In a case where the server device 200 determines that the last date of the provision period of the log information is passed, the server device 200 generates the display screen data that indicate that the last date of the provision period is passed (step S243). The display format based on such display screen data with respect to the group will be referred to as "third display format". On the other hand, in a case where the server device 200 determines that the last date of the provision period of the log information is not passed, the server device 200 regenerates the display screen data that indicate the last date of the provision period (step S244). The display format based on such display screen data with respect to the group is the above-described second display format. In other words, in this case, the display format with respect to the group does not change. The server device 200 thereafter transmits (again provides) the display screen data to the display terminal 300 (step S245).

Figure 16:
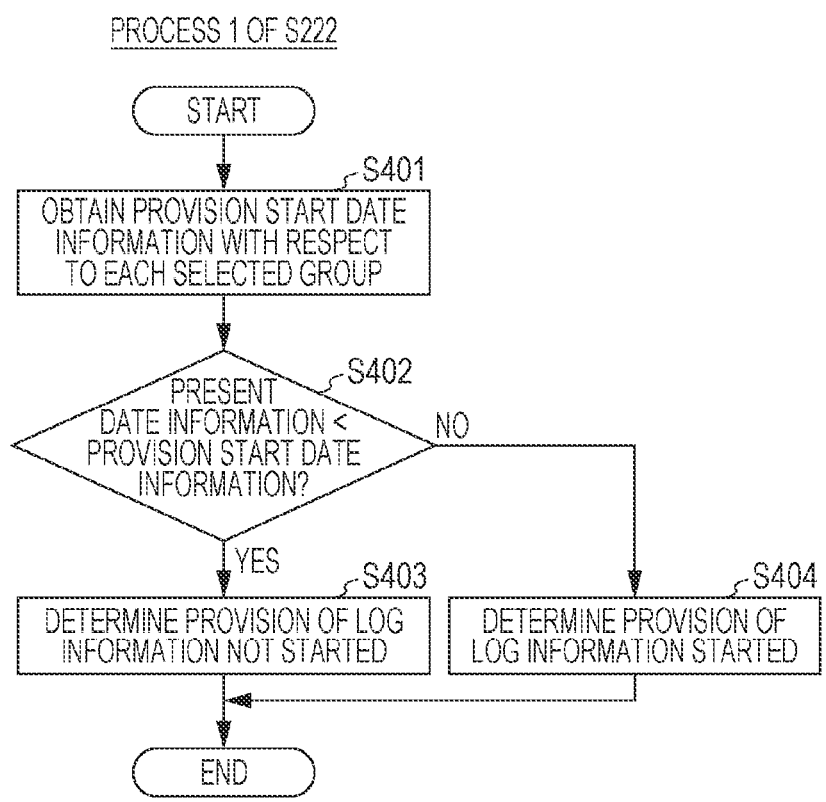
FIG. 16 is a flowchart that illustrates an example of a process of determining whether or not the log information is provided.

FIG. 16 is a flowchart that illustrates details of a process of step S222 in FIG. 14. In an example illustrated in FIG. 16, the server device 200 first obtains information of the provision start date for each of the groups in which refusal is selected (step S401). The information of the provision start date is the date information that is set when provision of the log information with respect to the group is permitted (for example, when an application to the service is made or when resumption is set) and that defines the start date of the log information provision. The start date of provision of the log information is in general set to a date after the application is made or the resumption is set. Thus, it may be assumed that there are some users who once permit provision of the log information but come to want to refuse before the provision start date. Thus, the server device 200 obtains the provision start date information with respect to each of the groups in order to determine whether or not provision of the log information Is started at the point when the setting of refusal is made. The server device 200 determines whether or not the present date is earlier than the provision start date (step S402). In a case where a determination is Yes here, the server device 200 determines that provision of the log information is yet to be started (step S403). On the other hand, in a case where a determination is No in step S402, the server device 200 determines that provision of the log information is already started (step S404).

Figure 17:
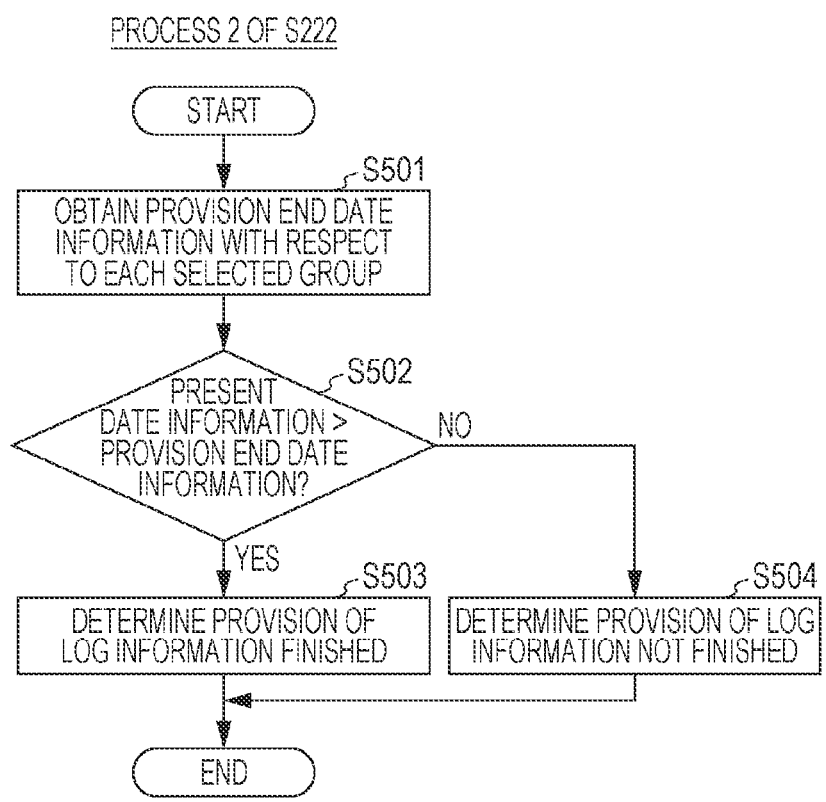
FIG. 17 is a flowchart that illustrates another example of the process of determining whether or not the log information is provided.

FIG. 17 is a flowchart that illustrates another example of the process of step S222 in FIG. 14. In the example illustrated in FIG. 17, the server device 200 first obtains information of the provision end date for each of the groups in which refusal is selected (step S501). The server device 200 next determines whether or not the present date is later than the provision end date (step S502). In a case where a determination is Yes here, the server device 200 determines that provision of the log information is finished (step S503). On the other hand, in a case where a determination is No in step S502, the server device 200 determines that provision of the log information is yet to be finished (step S504).

The server device 200 performs at least one of the processes illustrated in FIGS. 16 and 17 and may thereby make a determination about the provision state of the log information. In this embodiment, the server device 200 itself makes a determination about the provision state of the log information by comparing the dates. However, embodiments are not limited to such an example.

For example, another device may make a similar determination and update the management information, and the server device 200 may thereby make a determination about the provision state based on information of the log provision status of the updated management information.

4.2.3. Change of Management Information

Next, a description will be made about how contents of the management information are specifically changed by the above operations.

FIG. 18 illustrates a state of a change in one group of information that is contained in the management information. Here, only the group of "provision destination company: company L, home electrical apparatus kind: light, and provision log kind: lighting time" is illustrated as an example, and other groups are not illustrated. With respect to this group, the log provision permissibility is set to "permission" and the log provision status is set to "providing" before the setting of the provision permissibility of the log information Is updated (FIG. 18 (1)). Here, in a case where the provision permissibility of the log information of the group is changed to "refusal" by control by the user, the server device 200 changes the log provision permissibility of the management information to "refusal" and adds information of the date when provision of the log information is finished in the section of the provision end date (FIG. 18 (2)). Here, the provision end date may be the date one week after the present date, the last date of a month, or the date of the week that is defined by the service provider in one week from the present date, for example. The log provision status is still "providing" until the provision end date passes. When the provision end date is passed, the server device 200 changes the log provision status to "provision stopped" and deletes information of the provision end date.

As described above, the management information is updated in accordance with control for changing the setting by the user. Accordingly, the display screen data generated by referring to the management information is also changed. The user may confirm the present status with respect to each of the groups by referring to the display screen.

In the above example, a case where the log provision permissibility is changed from "permission" to "refusal" is assumed. However, in a case of a reverse change from "refusal" to "permission", the management information is updated by a similar concept. In this case, the section of the provision resumption date is used instead of the provision end date.

The system may be designed such that concepts such as the provision end date and the provision resumption date are not provided and provision is immediately finished or resumed. In such a case, the server device 200 immediately changes the management information from the state of FIG. 18 (1) to the state of FIG. 18 (3), for example.

4.2.4. Change of Display Screen

Next, the change of the display screen in response to the above operations will be described further in detail with reference to FIGS. 19 to 21. In FIGS. 19 to 21, bold grid lines that surround one group is added for easy understanding and are not necessarily indicated in an actual screen. Further, to avoid a complicated description, it is assumed that there is no change in the statuses of the other groups than the focused group.

FIG. 19 illustrates the display screen that is displayed immediately after a check mark is entered in "refuse to provide" of the highest group (provision destination company: company L, home electrical apparatus kind: light, and provision log kind: lighting time) and the update button 130 is pressed. Here, the display terminal 300 is waiting for a response from the server device 200 after the display terminal 300 transmits information about the setting change to the server device 200. In this state, the category changes to "reporting" with respect to the group, and the user may thereby confirm that communication is being performed.

FIG. 20 illustrates the display screen that is displayed after an update process of the management information in the server device 200 is completed and the response is provided from the server device 200. In this state, the group in which the setting is changed moves to a column for the category of "waiting for effective date", and a date is added to the section of the provision end date. Further, a check box for resumption of provision is added. The user enters a check mark in the check box, and provision of the log information may thereby be resumed. This state is subsequently maintained with respect to the group until the provision end date. This display format corresponds to the above "second display format".

FIG. 21 illustrates a state that is obtained after the provision end date is passed in the above example. In this state, the group moves to a column of the category of "provision stopped", and the section of the provision end date changes to "done (end date 2013 Mar. 15)". This state is subsequently maintained with respect to the group until the user performs control for resuming providing the log information. This display format corresponds to the above "third display format".

4.3. Effects and So Forth

As described above, an information management method of this embodiment enables management of the provision permissibility of the log information with respect to each of the groups. In a case where the server device 200 determines that selection of refusal of provision of one kind of the log information of one home electrical apparatus 400 that corresponds to one service provider 600 is performed with respect to the group as a unit, the server device 200 stops provision of the log information with respect to the group in which the selection of refusal is performed.

Accordingly, it is not necessary to individually specify the service provider 600, the home electrical apparatus 400, and the kind of the log information when the user selects refusal of provision of the log information, and the user may collectively perform selection for the group as a unit. Thus, a process frequency in the server device 200 and the display terminal 300 may be reduced, and process loads to the network and the server device 200 may also be reduced. Further, the user may avoid inconvenience in individually selecting refusal of provision for each of the service provider 600, the home electrical apparatus 400, and the kind of the log information.

Further, in a case where the server device 200 determines that selection of refusal of provision of the log information is performed with respect to the group as a unit and determines that provision of the log information is yet to be started with respect to the group in which refusal is selected, the server device 200 regenerates the display screen data such that display is made in the first display format that indicates that the log information Is not provided with respect to the group and provides the display screen data to the display terminal 300. On the other hand, in a case where the server device 200 determines that the log information is already provided with respect to the group in which refusal is selected, the server device 200 regenerates the display screen data such that display is made in the second display format that indicates that the log information is provided until the last date of the provision period of the log information that is set with respect to the group and provides the display screen data to the display terminal 300.

This enables prevention of incorrect control due to misunderstanding that provision of the log information is already stopped at a point when refusal is selected in a case where provision of the log information is already started. For example, this allows the user to recognize that provision of the log information actually continues until the last date of the provision period although one service provider 600, one home electrical apparatus 400, and one kind of the log information for which refusal of provision is selected as the group as a unit are displayed as a provision refusal state on the display screen.

5. Second Embodiment

A second embodiment of the present disclosure will next be described with reference to FIGS. 22 to 26. In this embodiment, in addition to the operations in the first embodiment, provision of the log information may be resumed after refusal of provision is once selected. A configuration of a system in this embodiment is the same as the first embodiment. Different points from the first embodiment will mainly be described below, and a description about common matters will not be made.

Figure 22:
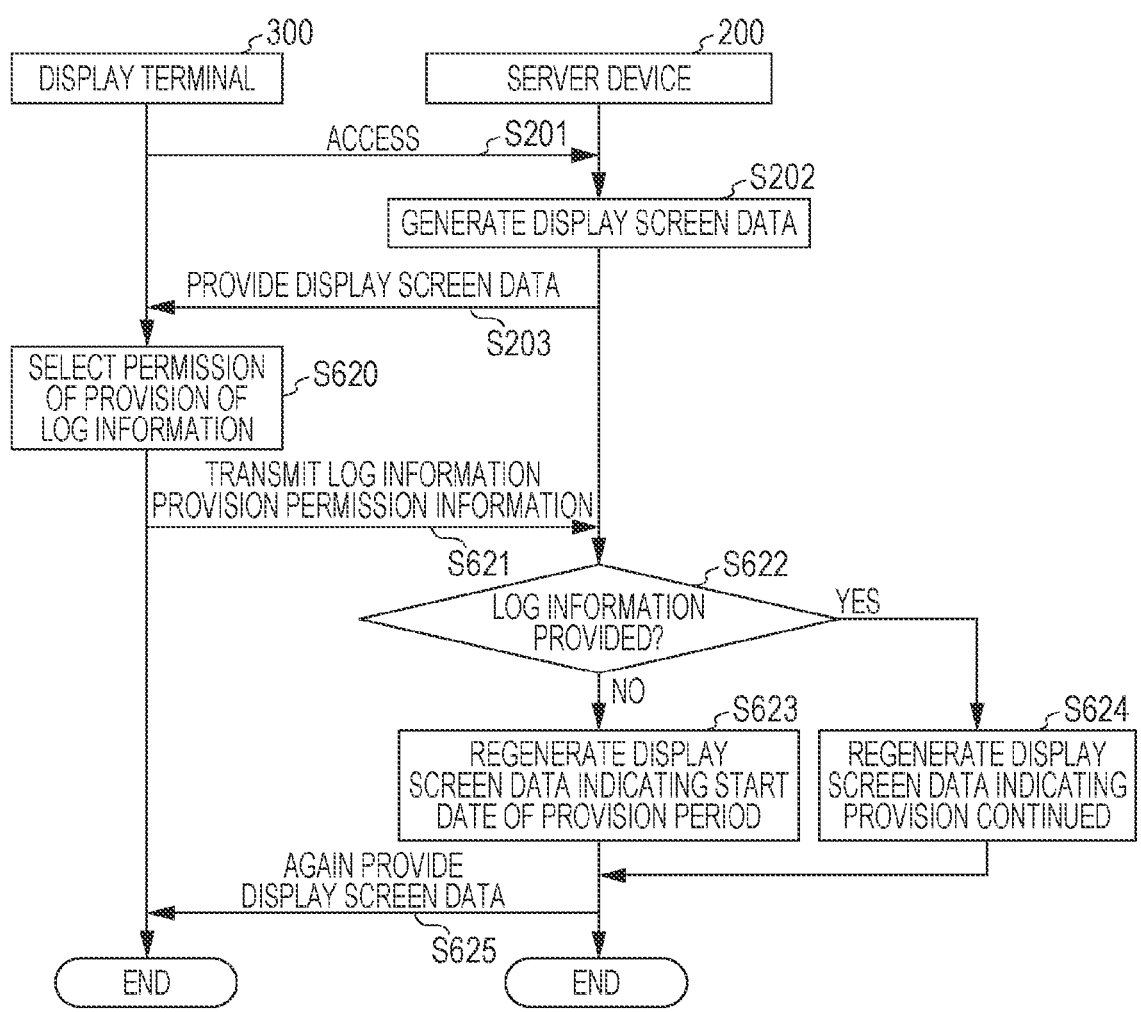
FIG. 22 is a sequence diagram that illustrates an operation of a system in a second embodiment.

FIG. 22 is a sequence diagram that illustrates an operation in this embodiment. In this embodiment, the server device 200 determines whether or not the log information is provided after selection of refusal of provision of the log information is completed and generates the display data of different display formats in accordance with the determination results. The operations of steps S201 to S203 are the same as the corresponding operations in FIGS. 12 and 14, and a description will not be made.

In this embodiment, the display terminal 300 selects permission of provision of the log information with respect to a specified group in response to control by the user (step S620). The display terminal 300 then transmits information that indicates that the user permits to provide the log information with respect to the group (step S621).

When the server device 200 receives the information, the server device 200 determines whether or not the group is in a state where the log information is provided at the present point (step S622). In a case where the group is not in the state where the log information is provided, the server device 200 regenerates the display screen data that indicate the start date of the provision period (resumption date) (step S623). On the other hand, in a case where a determination is made that the group is in the state where the log information is provided, the server device 200 regenerates the display screen data that indicate that provision of the log information continues (step S624). The server device 200 thereafter transmits (again provides) the display screen data to the display terminal 300 (step S625).

Figure 23:
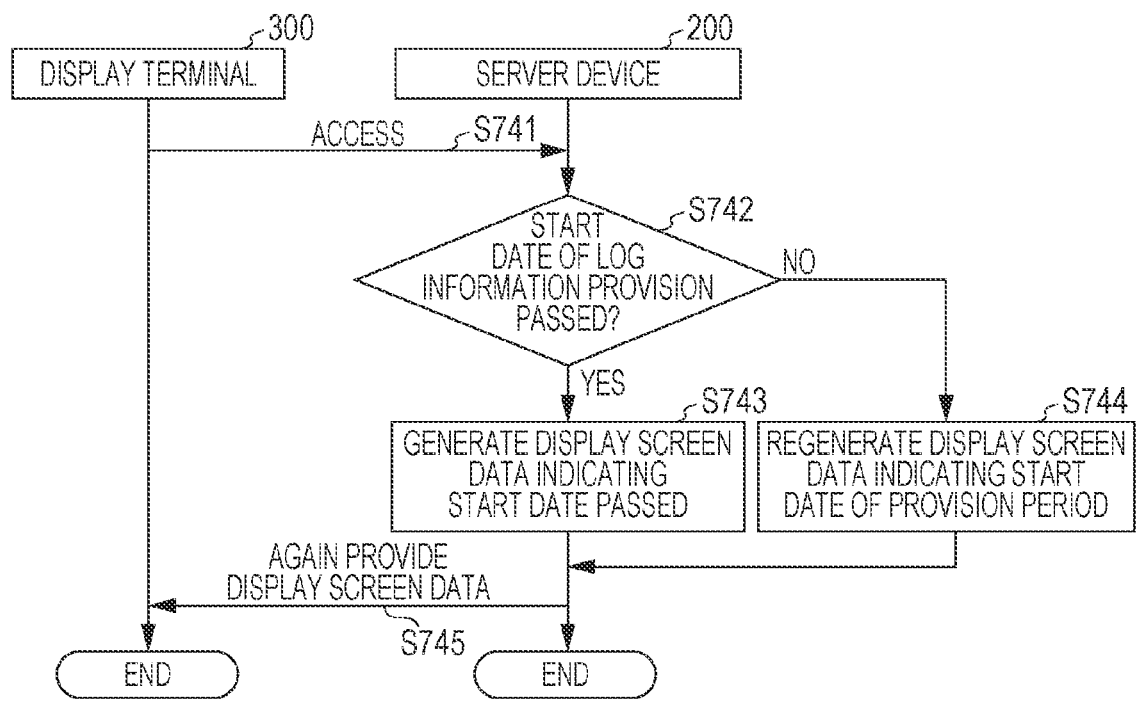
FIG. 23 is a sequence diagram that illustrates another operation of the system in the second embodiment.

FIG. 23 is a sequence diagram that illustrates an operation example in a case where the display terminal 300 again accesses the server device 200 after a process of step S623 is performed in FIG. 22. The display terminal 300 first accesses the server device 200 and demands the display screen data (step S741). The server device 200 determines whether or not the start date of the provision period of the log information that is set for the group is passed at the present date (step S742). In a case where the server device 200 determines that the start date of the provision period of the log information is passed, the server device 200 generates the display screen data that indicate that the start date of the provision period is passed (step S743). On the other hand, in a case where the server device 200 determines that the start date of the provision period of the log information is not passed, the server device 200 regenerates the display screen data that indicate the start date of the provision period (step S744). The server device 200 thereafter transmits (again provides) the display screen data to the display terminal 300 (step S745).

A method of a determination process of whether or not the log information is provided in step S622 in FIG. 22 is the same as the method that is described with reference to FIGS. 16 and 17, and thus a description will not be made.

Next, a description will be made about how contents of the management information are specifically changed by the above operations.

FIG. 24 illustrates a state of a change in one group of information that is contained in the management information. Here, only the group of "provision destination company: company L, home electrical apparatus kind: light, and provision log kind: lighting time" is also illustrated as an example, and other groups are not illustrated. With respect to this group, the log provision permissibility is set to "refusal" and the log provision status is set to "provision stopped" before the setting of the provision permissibility of the log information is updated (FIG. 24 (1)). Here, in a case where the provision permissibility of the log information of the group is changed to "permission" by control by the user, the server device 200 changes the log provision permissibility of the management information to "permission" and adds information of the date when provision of the log information is started in the section of the provision resumption date (FIG. 24 (2)). Here, the provision resumption date may be the date one week after the present date, the first date of a month, or the date of the week that is defined by the service provider in one week from the present date, for example. The log provision status is still "provision stopped" until the provision resumption date passes. When the provision resumption date is passed, the server device 200 changes the log provision status to "providing" and deletes information of the provision resumption date.

Next, the change of the display screen in response to the above operations will be described with reference to FIGS. 25 to 27.

FIG. 25 illustrates the display screen that is displayed immediately after a check mark is entered in "resume providing" of the group in which a process of refusal of provision of the log information is completed (provision destination company: company L, home electrical apparatus kind: light, and provision log kind: lighting time) and the update button 130 is pressed. Here, the display terminal 300 is waiting for a response from the server device 200 after the display terminal 300 transmits information about the setting change to the server device 200. In this state, the category changes to "reporting" with respect to the group.

FIG. 26 illustrates the display screen that is displayed after an update process of the management information in the server device 200 is completed and the response is provided from the server device 200. In this state, the group in which the setting is changed is changed to the category of "waiting for effective date", and a date is added to the section of the provision resumption date. Further, a check box for refusal of provision is added. The user enters a check mark in the check box, and refusal of provision of the log information may thereby be again selected. This state is subsequently maintained with respect to the group until the provision resumption date.

In a case where the user again selects refusal of provision in this state and presses the update button, the group is displayed in the "first display format" that indicates that the log information is not provided. The first display format may be the same display format as the third display format that is applied to the group in FIG. 21 but may be different.

FIG. 27 illustrates a state that is obtained after the provision resumption date is passed in the above example. In this state, the group moves to a column of the category of "providing", and the section of the provision resumption date changes to "done (resumption date 2013 Jun. 15)". This state is subsequently maintained with respect to the group until the user performs control for refusing to provide the log information.

As described above, this embodiment allows the group in which refusal of provision of the log information is selected to resume provision. Further, the setting may be returned to refusal after control for resumption of provision is performed and until the provision resumption date. Because information such as the provision state and the provision resumption date with respect to each of the groups may be understood by a quick view, this enables avoidance of incorrect control due to misunderstanding that the resumption is already started even though provision of the log information is yet to be resumed, for example.

6. Another Example of Service Providing System

A description will be made below about another example of a service providing system to which the techniques of the present disclosure may be applied.

FIG. 28A is a diagram that illustrates a general image of the service providing system. The service providing system includes plural information apparatuses that are respectively provided in a user group 100, a data center operating company 110, and a service provider 120.

The user group 100 is a company, a party, a home, or the like, for example, regardless of a scale. The user group 100 includes plural home electrical apparatuses 101 that include an apparatus A and an apparatus B and a home gateway 102. Each of the plural home electrical apparatuses 101 has a communication function and is capable of transmission and reception of data with other apparatuses. The plural home electrical apparatuses 101 may include apparatuses that have a configuration and a function for directly connecting with the Internet and apparatuses that do not have such configuration and function. The apparatuses that correspond to the ones that have the configuration and the function for directly connecting with the Internet may be smart phone, tablet terminal, dedicated display terminal, personal computer (PC), or TV, for example. The apparatuses that correspond to the ones that do not have the configuration and the function for directly connecting with the Internet may be light, washing machine, or refrigerator, for example. As described above, there may be an apparatus that becomes connectable with the Internet via the home gateway 102. The plural home electrical apparatuses 101 in the user group 100 are used by one or more users 10. The user 10 is described for convenience of description and is not included in the service providing system.

The home gateway 102 receives the log information about an operation of the apparatus from each of the plural home electrical apparatuses 101 and transmits the log information to a cloud server 111. The home gateway 102 accumulates the log information and provides the accumulated log information to the cloud server 111 once a day, for example.

FIG. 28A illustrates the single home gateway 102. However, this is merely one example. Plural home gateways may be present. In a case where the plural home gateways are present, another home gateway (child home gateway) may be connected with the home gateway that is connected with an external network (parent home gateway), for example. The child home gateway receives the log information from the single or plural apparatuses among the plural home electrical apparatuses 101 and accumulates the log information and uploads the log information to a server through the parent home gateway. Alternatively, the child home gateway may output signals for controlling the single or plural apparatuses among the plural home electrical apparatuses 101 via the parent home gateway.

The data center operating company 110 includes the cloud server 111. The cloud server 111 is a virtual server that cooperates with various apparatuses via the Internet, for example. The cloud server 111 mainly manages very large data groups (so-called "big data") and so forth that existing general techniques typically represented by usual database management tools and so forth have difficulty in handling. The data center operating company 110 performs data management, management of the cloud server 111, an operation of the data center that performs such management, and so forth. Work that the data center operating company 110 performs will be described in detail below.

Figure 28B:
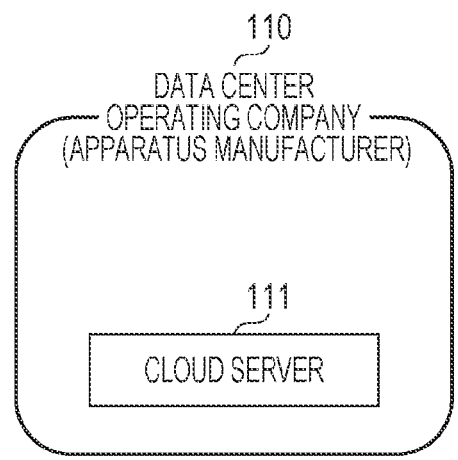
FIG. 28B is a diagram that illustrates an example of a change of a data center operating company in the present disclosure.
Figure 28C:
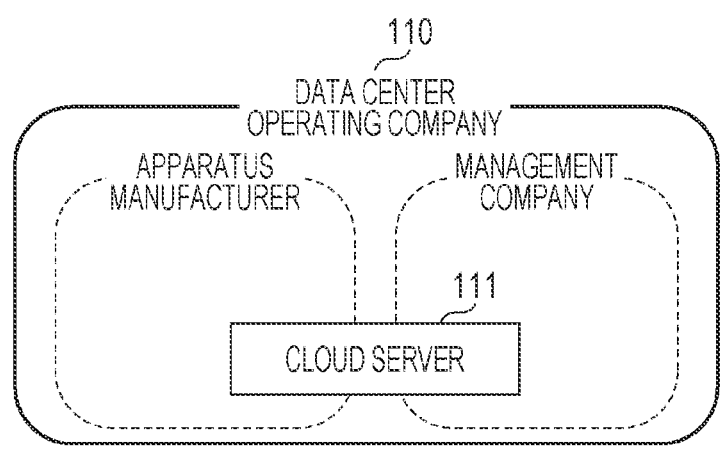
FIG. 28C is a diagram that illustrates an example of the change in the data center operating company in the present disclosure.

The data center operating company 110 is not limited to a company that performs only the data management and the operation of cloud server 111. FIGS. 28B and 28C illustrate modification examples of the data center operating company 110. FIG. 28B illustrates an apparatus manufacturer that functions as the data center operating company 110. In a case where an apparatus manufacturer that develops and manufactures the apparatus included in the plural home electrical apparatuses 101 also performs data management, management of the cloud server 111, and so forth, the apparatus manufacturer corresponds to the data center operating company 110. Further, FIG. 28C illustrates plural companies that cooperatively manage the single cloud server 111. As described above, the data center operating company 110 is not limited to a single company. In a case where an apparatus manufacturer and another management company cooperatively or partially perform data management and the operation of the cloud server 111, both of those correspond to the data center operating company 110. Even if the apparatus manufacturer and the other management company cooperatively or partially perform data management and management of the cloud server 111, only either one of the apparatus manufacturer and the management company may function as the data center operating company 110. Further, the data center operating company 110 may have a function of the service provider.

The above-described cloud server 111 may be realized not only as a computer that is hardware but also as software in which necessary functions for the cloud server 111 are programmed.

The service provider 120 possesses a server 121. The scale of the server 121 in this case does not matter as long as the server 121 means a computer or a recording medium that has a function of providing data or a service based on the data. For example, considering that data may be provided by using a private PC, the private PC itself or a memory or the like in the private PC may also be included in "server". Further, there may be a case where the service provider 120 does not possess the server 121.

It should be noted that the home gateway 102 is not essential in the above service providing system. For example, in a case where the cloud server 111 performs the whole data management, the home gateway 102 is not necessary. Further, in a case where all apparatuses in the home have a configuration and a function for connecting with the Internet and there is no apparatus that is not itself capable of connecting with the Internet, the home gateway 102 may be omitted. The log information may directly be provided from the plural home electrical apparatuses 101 to the cloud server 111 via the Internet.

A flow of information in the above service will next be described.

First, the apparatus A or the apparatus B of the user group 100 transmits the log information to the cloud server 111 of the data center operating company 110. The cloud server 111 receives and accumulates the log information that is transmitted from the apparatus A or the apparatus B (arrow (a) of FIG. 28A).

Next, the cloud server 111 of the data center operating company 110 provides the accumulated log information to the service provider 120 by a certain unit. Here, "certain unit" may be a unit of the accumulated information that may be arranged by the data center operating company and then provided to the service provider 120 or a unit that is demanded by the service provider 120. A description is made as a certain unit, but provision of the log information may not be performed by a certain unit. There may be a case where the amount of the log information changes in accordance with a circumstance. The log information is stored in the server 121 possessed by the service provider 120 as necessary (arrow (b) in FIG. 28A).

The service provider 120 arranges the log information into information that conforms to the service provided to the user and provides the information to the user. The user that is provided with the information may be the user 10 that uses or possesses the plural home electrical apparatuses 101 or may be an external user 20. In a providing method of the service to the user, for example, the service may directly be provided from the service provider 120 to the user 10 or 20 (arrow (e) or (f) in FIG. 28A). Further, for example, the service may be provided to the user 10 while again passing through the cloud server 111 of the data center operating company 110 (arrows (c) and (d) in FIG. 28A). Further, the cloud server 111 of the data center operating company 110 may arrange the log information Into Information that conforms to the service provided to the user and provide the information to a computer of the service provider 120.

The user 10 may be different from or the same as the user 20. Further, all of the plural home electrical apparatuses 101, the cloud server 110, and the server 121 do not need to be placed in the same country. For example, the plural home electrical apparatuses 101 may be placed in Japan, and the cloud server 111 and the server 121 may be placed in the United States. Alternatively, the opposite circumstance is possible. In a case where at least one of the cloud server 111 and the server 121 provides a result of analysis or the like by control (administration) by the user 10 and the user may confirm the result of analysis by using the display terminal such as PC, it may be considered that the user receives benefit in the country. Such a case may be considered to be substantially same as a case where the system is placed in one country.

In a case where information that identifies the individual users 10 is contained in collection of the log information (arrows (a) and (b) In FIG. 28A) and provision of the information (arrows (c), (d), (e), and (f) In FIG. 28A), the information is possibly abused. Thus, an operation is possible in which information that identifies the individual users 10 such as name is not contained in the log information. In a case where information that identifies the individual users 10 is contained, the apparatus that transmits the information may transmit encrypted information in order to prevent leakage of personal information.

7. Types of Cloud Service for Realizing Service Providing System

The techniques described in the above embodiments may be realized in the following types of cloud services, for example. The types of the cloud services are not limited to those.

7.1. Service Type 1: Own Company Data Center Type Cloud Service

Figure 29:
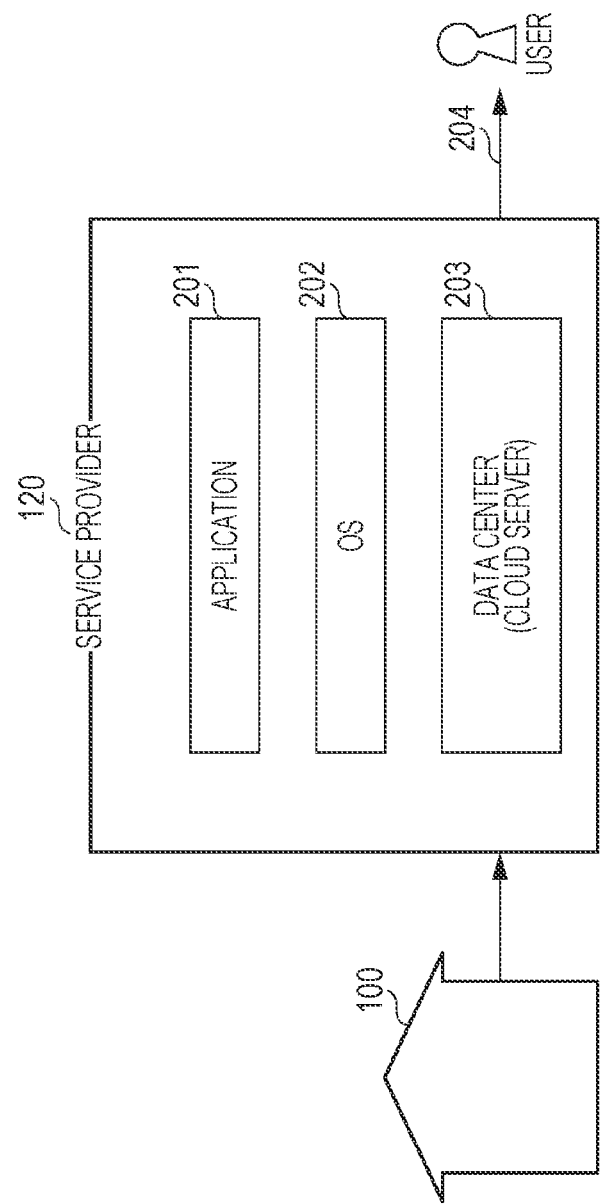
FIG. 29 is a general configuration diagram of service type 1 of the information management system in the present disclosure.

FIG. 29 illustrates a general image of a service provided by a system that uses service type 1 (own company data center type cloud service). In this type, the service provider 120 obtains information from the user group 100 and provides a service to the user. In this type, the service provider 120 has the function of the data center operating company. That is, the service provider 120 possesses a cloud server 203 that manages big data. Thus, there is no data center operating company.

In this type, the service provider 120 operates and manages a data center (cloud server) 203. Further, the service provider 120 manages an operating system (OS) 202 and an application 201. The service provider 120 provides the service by using the OS 202 and the application 201 that are managed by the service provider 120 (arrow 204).

7.2. Service Type 2: IaaS Using Type Cloud Service

Figure 30:
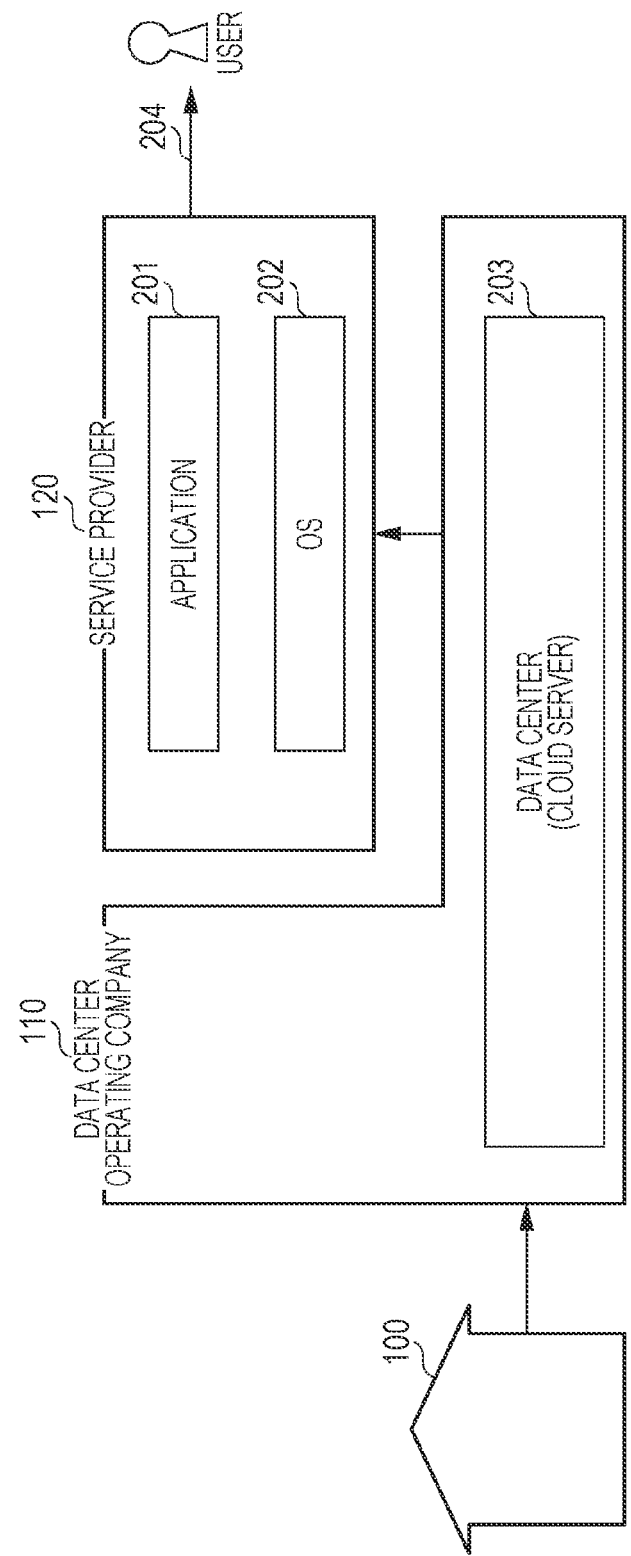
FIG. 30 is a general configuration diagram of service type 2 of the information management system in the present disclosure.

FIG. 30 illustrates a general image of a service provided by a system in service type 2 (IaaS using type cloud service). Here, IaaS stands for infrastructure as a service and is a cloud service providing model that provides foundations themselves for configuring a computer system and causing the computer system to work as a service via the Internet.

In this type, the data center operating company 110 operates and manages the data center (cloud server) 203. Further, the service provider 120 manages the OS 202 and the application 201. The service provider 120 provides the service by using the OS 202 and the application 201 that are managed by the service provider 120 (arrow 204).

7.3. Service Type 3: PaaS Using Type Cloud Service

Figure 31:
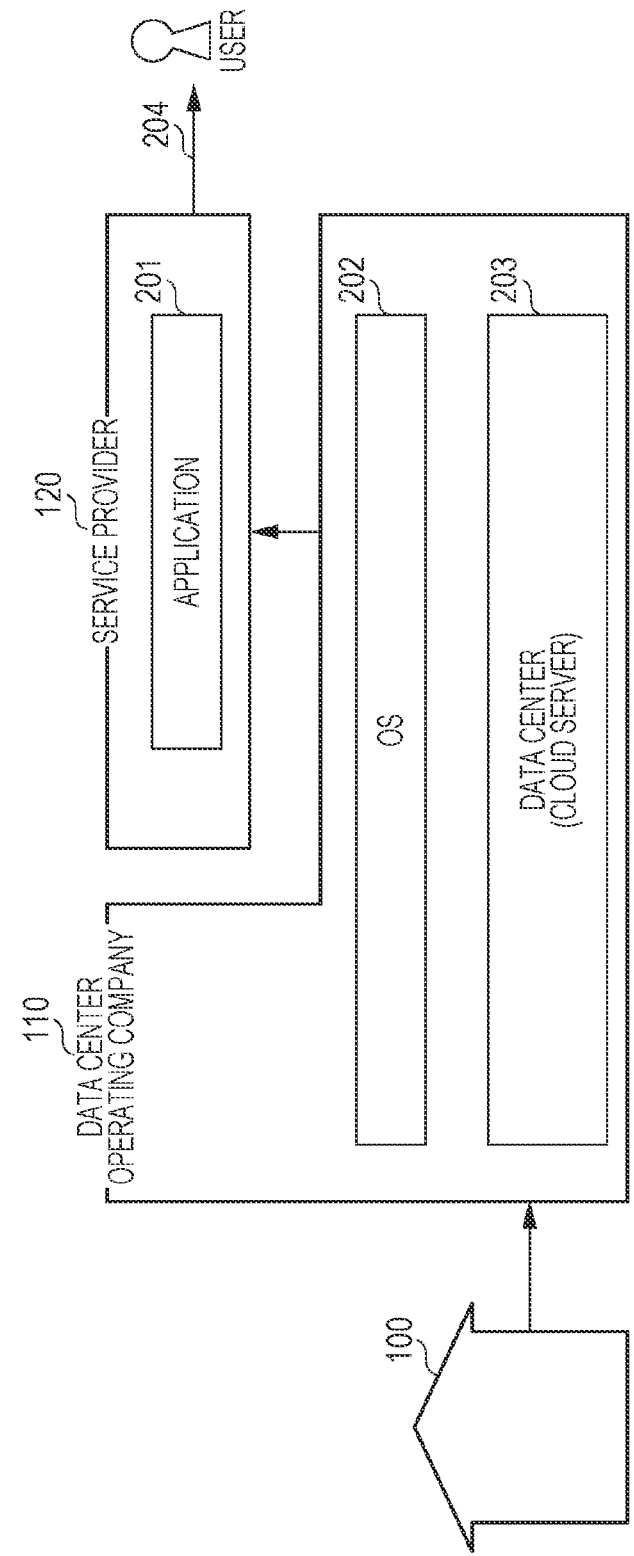
FIG. 31 is a general configuration diagram of service type 3 of the information management system in the present disclosure.

FIG. 31 illustrates a general image of a service provided by a system that uses service type 3 (PaaS using type cloud service). Here, PaaS stands for platform as a service and is a cloud service providing model that provides a platform that serves as a basis for configuring software and causing the software to work as a service via the Internet.

In this type, the data center operating company 110 manages the OS 202 and operates and manages the data center (cloud server) 203. Further, the service provider 120 manages the application 201. The service provider 120 provides the service by using the OS 202 that is managed by the data center operating company 110 and the application 201 that is managed by the service provider 120 (arrow 204).

7.4. Service Type 4: SaaS Using Type Cloud Service

Figure 32:
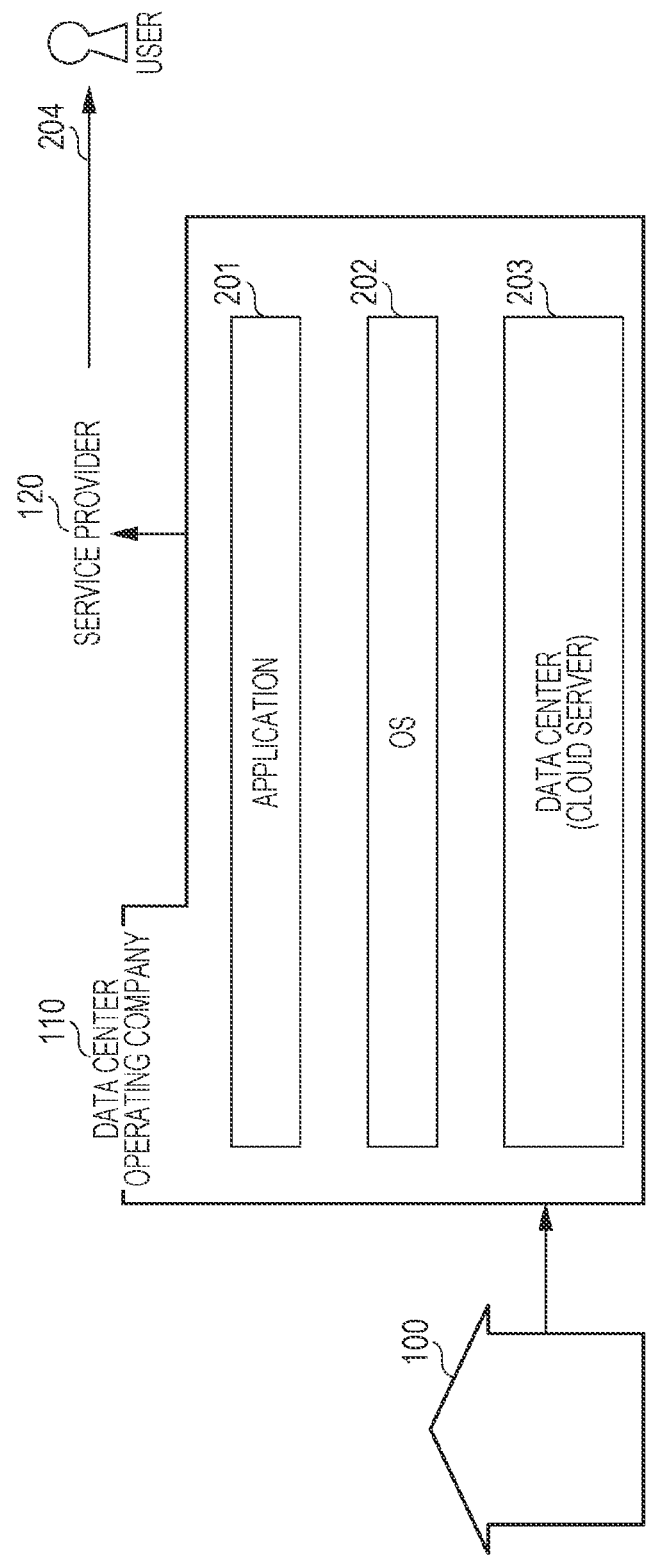
FIG. 32 is a general configuration diagram of service type 4 of the information management system in the present disclosure.

FIG. 32 illustrates a general image of a service provided by a system that uses service type 4 (SaaS using type cloud service). Here, SaaS stands for software as a service. The SaaS using type cloud service is a cloud service providing model that has a function by which a user such as a company or an individual that does not possess the data center (cloud server) may use an application provided by a platform provider that possesses the data center (cloud server) via a network such as the Internet, for example.

In this type, the data center operating company 110 manages the application 201 and the OS 202 and operates and manages the data center (cloud server) 203. Further, the service provider 120 provides the service by using the OS 202 and the application 201 that are managed by the data center operating company 110 (arrow 204).

As described above, the service provider 120 provides the service in any of the types of cloud services. Further, for example, the service provider or the data center operating company may itself develop the OS, the application, a database of big data, and so forth or may outsource those to a third party.

The techniques of the present disclosure are useful when the techniques are realized as a service providing system that provides a cloud service by using log information of a home electrical apparatus.

What is claimed is:

1. An information management method in an information management system that collects log information of one or more apparatuses and provides information based on the log information, the information management method comprising:

collecting the log information of the one or more apparatuses of a user via a network;
 generating display screen data that indicate a provision status of the log information of the one or more apparatuses, the one or more apparatuses corresponding to one or more service providers, wherein the display screen data includes: (i) information that configures one apparatus that is included in the one or more apparatuses; (ii) one service provider that corresponds to the one apparatus; and (iii) one kind of the log information that is output from the one apparatus as a group and displays a provision status of the log information with respect to the group as a unit, wherein a purpose of use of the log information is with respect to the group as the unit, and wherein a section by which whether or not provision of the log information is permissible is selectable with respect to the group as the unit;
 providing the display screen data to a display terminal that performs access to the information management system via the network in response to the access to the information management system;
 receiving, based on the display screen data from the display terminal via the network, information that indicates whether a selection of permission, of whether or not provision of the one kind of the log information of the one apparatus that corresponds to the one service provider for the purpose of use is permissible, is performed with respect to the group as the unit in a display screen;
 providing, to the display terminal via the network and in a case where:
  a first determination is made that the selection of permission of the provision of the one kind of the log information of the one apparatus that corresponds to the one service provider for the purpose of use is performed with respect to the group as the unit; and
  a second determination is made that the provision of the log information is not yet performed with respect to the group in which the selection of permission is performed, the display screen data regenerated such that display is made in a first display format which indicates that the provision of the log information is not performed until a provision start date when the provision of the log information that is set with respect to the group is started; and
 providing, to a computer of the one service provider via the network, the log information generated on and after the provision start date.

2. The information management method according to claim 1,
 wherein the provision start date is set to be after a predetermined period has elapsed since the selection of permission is made by the user via the display screen data.

3. The information management method according to claim 1,
 wherein the provision start date is set based on a preset date predetermined by the information management system.

* * * * *